US012810766B2

(12) United States Patent
Kim et al.

(10) Patent No.: US 12,810,766 B2

(45) Date of Patent: Nov. 24, 2026

(54) GATE DRIVING CIRCUIT AND ELECTRONIC APPARATUS INCLUDING THE SAME

(71) Applicant: Samsung Display Co., Ltd., Yongin-si (KR)

(72) Inventors: Jonghee Kim, Yongin-si (KR); Boyong Chung, Yongin-si (KR); Hyuk Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/375,612

(22) Filed: Oct. 31, 2025

(65) Prior Publication Data

US 2026/0188175 A1 Jul. 2, 2026

(30) Foreign Application Priority Data

Dec. 27, 2024 (KR) ........................ 10-2024-0199116

(51) Int. Cl.
*G09G 3/20* (2006.01)

(52) U.S. Cl.
CPC ... *G09G 3/2092* (2013.01); *G09G 2310/0267* (2013.01); *G09G 2310/0286* (2013.01); *G09G 2320/045* (2013.01)

(58) Field of Classification Search
None
See application file for complete search history.

(56) References Cited

U.S. PATENT DOCUMENTS

| | | | |
|---|---|---|---|
| 10,847,082 B2 | 11/2020 | Kim | |
| 11,120,745 B2 | 9/2021 | Kim | |
| 11,120,750 B2 | 9/2021 | Kim | |
| 11,151,931 B2 | 10/2021 | Kim et al. | |
| 11,151,943 B1 | 10/2021 | Xue et al. | |
| 11,227,552 B2 | 1/2022 | Kim et al. | |
| 11,257,436 B2 | 2/2022 | Kim | |
| 11,282,463 B2 | 3/2022 | Kim et al. | |
| 2022/0366855 A1* | 11/2022 | Chang | G09G 3/3266 |

FOREIGN PATENT DOCUMENTS

| | | |
|---|---|---|
| KR | 10-20200023563 A | 3/2020 |
| KR | 10-20220095652 A | 7/2022 |
| KR | 10-20230102585 A | 7/2023 |
| KR | 102742416 B1 | 12/2024 |

* cited by examiner

*Primary Examiner* — Nicholas J Lee

(74) *Attorney, Agent, or Firm* — Harness, Dickey & Pierce, P.L.C.

(57) ABSTRACT

A gate driving circuit includes a plurality of stages. A first stage among the plurality of stages includes an output circuit configured to output a plurality of gate signals based on a signal of a first control node and a signal of a second control node, the plurality of gate signals corresponding to a plurality of clock signals, and a first capacitor including a first electrode and a second electrode, the first electrode of the first capacitor being configured to receive one of a plurality of gate signals of a next stage among the plurality of stages, and the second electrode of the first capacitor being connected to the first control node of the first stage.

20 Claims, 19 Drawing Sheets

GATE DRIVING CIRCUIT AND ELECTRONIC APPARATUS INCLUDING THE SAME

PRIORITY STATEMENT

This application claims priority under 35 U.S.C. § 119 to Korean Patent Application No. 10-2024-0199116, filed on Dec. 27, 2024 in the Korean Intellectual Property Office KIPO, the contents of which are herein incorporated by reference.

BACKGROUND

1. Field

Embodiments of the present inventive concepts relate to a gate driving circuit and an electronic apparatus including the gate driving circuit. More particularly, embodiments of the present inventive concepts relate to a gate driving circuit including a stage outputting a plurality of gate signals and an electronic apparatus including the gate driving circuit.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver and a data driver. The gate driver outputs gate signals to the gate lines. The data driver outputs data voltages to the data lines.

The gate driver may include a plurality of stages. A single stage of the gate driver may output plural gate signals. When the single stage outputs the plural gate signals, a waveform difference between the gate signals may occur according to a level of a voltage of a control node.

SUMMARY

Embodiments of the present inventive concepts provide a gate driving circuit reducing a waveform difference between plural gate signals when a single stage outputs the plural gate signals.

Embodiments of the present inventive concepts also provide an electronic apparatus including the gate driving circuit.

In embodiments of a gate driving circuit according to the present inventive concepts, the gate driving circuit includes a plurality of stages. A first stage among the plurality of stages includes an output circuit configured to output a plurality of gate signals based on a signal of a first control node and a signal of a second control node, the plurality of gate signals corresponding to a plurality of clock signals, and a first capacitor including a first electrode and a second electrode, the first electrode of the first capacitor being configured to receive one of a plurality of gate signals of a next stage among the plurality of stages, and the second electrode of the first capacitor being connected to the first control node of the first stage.

In embodiments, the first electrode of the first capacitor is configured to receive an earliest gate signal among the plurality of gate signals of the next stage.

In embodiments, the first stage may include a second capacitor including a first electrode and a second electrode, the first electrode of the second capacitor being configured to receive one of a plurality of gate signals of a previous stage among the plurality of stages, and the second electrode of the second capacitor being connected to the first control node of the first stage.

In embodiments, the first electrode of the second capacitor may be configured to receive a last gate signal among the plurality of gate signals of the previous stage.

In embodiments, the output circuit may include a first output transistor including a control electrode, a first electrode and a second electrode, the control electrode of the first output transistor being connected to the first control node, the first electrode of the first output transistor being configured to receive a first clock signal, and the second electrode of the first output transistor being connected to a first output node, a second output transistor including a control electrode, a first electrode and a second electrode, the control electrode of the second output transistor being connected to the second control node, the first electrode of the second output transistor being configured to receive a power voltage, and the second electrode of the second output transistor being connected to the first output node, a third output transistor including a control electrode, a first electrode and a second electrode, the control electrode of the third output transistor being connected to the first control node, the first electrode of the third output transistor being configured to receive a second clock signal, and the second electrode of the third output transistor being connected to a second output node, and a fourth output transistor including a control electrode, a first electrode and a second electrode, the control electrode of the fourth output transistor being connected to the second control node, the first electrode of the fourth output transistor being configured to receive the power voltage, and the second electrode of the fourth output transistor being connected to the second output node.

In embodiments, the first stage may include a carry circuit, the carry circuit including a first carry transistor including a control electrode, a first electrode and a second electrode, the control electrode of the first carry transistor being connected to the first control node, the first electrode of the first carry transistor being configured to receive a carry clock signal, and the second electrode of the first carry transistor being connected to a carry output node, and a second carry transistor including a control electrode, a first electrode and a second electrode, the control electrode of the second carry transistor being connected to the second control node, the first electrode of the second carry transistor being configured to receive a second power voltage, and a second electrode of the second carry transistor being connected to the carry output node.

In embodiments, the first stage may include a first circuit, the first circuit including a first transistor including a control electrode, a first electrode and a second electrode, the control electrode of the first transistor being configured to receive a previous carry signal of a previous stage among the plurality of stages, the first electrode of the first transistor being configured to receive a power voltage, and the second electrode of the first transistor being connected to a first node, and a second transistor including a control electrode, a first electrode and a second electrode, the control electrode of the second transistor being configured to receive the previous carry signal, the first electrode of the second transistor being connected to the first node, and the second electrode of the second transistor being connected to the first control node.

In embodiments, the first stage may include a second circuit, the second circuit including a third transistor including a control electrode, a first electrode, and a second electrode, the control electrode of the third transistor being configured to receive the power voltage, the first electrode of the third transistor being configured to receive the power voltage, and the second electrode of the third transistor being connected to the first node.

In embodiments, the first stage may include a first circuit, the first circuit including a first transistor including a control electrode, a first electrode and a second electrode, the control electrode of the first transistor being configured to receive a control signal, the first electrode of the first transistor being configured to receive a previous carry signal, and the second electrode of the first transistor being connected to a first node, and a second transistor including a control electrode, a first electrode and a second electrode, the control electrode of the second transistor being configured to receive the control signal, the first electrode of the second transistor being connected to the first node, and the second electrode of the second transistor being connected to a second node.

In embodiments, the first stage may include a second circuit, the second circuit including a third transistor including a control electrode, a first electrode and a second electrode, the control electrode of the third transistor being connected to the second node, the first electrode of the third transistor being configured to receive a power voltage, and the second electrode of the third transistor being connected to the first node.

In embodiments, the first stage may include a first circuit, the first circuit including a first transistor including a control electrode, a first electrode and a second electrode, the control electrode of the first transistor being connected to a first node, the first electrode of the first transistor being configured to receive a power voltage, and the second electrode of the first transistor being connected to a second node, and an second transistor including a control electrode, a first electrode and a second electrode, the control electrode of the second transistor being configured to receive a control signal, the first electrode of the second transistor being connected to the first node, and the second electrode of the first transistor being connected to the first control node.

In embodiments, the first stage may include a first circuit, the first circuit including a first transistor including a control electrode, a first electrode and a second electrode, the control electrode of the first transistor being connected to the first control node, the first electrode of the first transistor being configured to receive a power voltage, and the second electrode of the first transistor being connected to a first node, and a second transistor including a control electrode, a first electrode and a second electrode, the control electrode of the second transistor being connected to the first control node, the first electrode of the second transistor being connected to the first node, and the second electrode of the second transistor being connected to a third control node.

In embodiments, the first stage may include a first circuit, the first circuit including a first transistor including a control electrode, a first electrode and a second electrode, the control electrode of the first transistor being connected to first node, the first electrode of the first transistor being configured to receive a power voltage, and the second electrode of the first transistor being connected to a second node, and a second transistor including a control electrode, a first electrode and a second electrode, the control electrode of the second transistor being configured to receive a control signal, the first electrode of the second transistor being connected to the second node, and the second electrode of the second transistor being connected to the second control node.

In embodiments, the first stage may include a first circuit, the first circuit including a first transistor including a control electrode, a first electrode and a second electrode, the control electrode of the first transistor being configured to receive an inverter power voltage, the first electrode of the first transistor being configured to receive the inverter power voltage, and the second electrode of the first transistor being connected to a first node, a second transistor including a control electrode, a first electrode and a second electrode, the control electrode of the second transistor being configured to receive the inverter power voltage, the first electrode of the second transistor being connected to the first node, and the second electrode of the second transistor being connected to a second node, a third transistor including a control electrode, a first electrode and a second electrode, the control electrode of the third transistor being connected to the first control node, the first electrode of the third transistor being connected to the second node, and the second electrode of the third transistor being configured to receive a first power voltage, a fourth transistor including a control electrode, a first electrode and a second electrode, the control electrode of the fourth transistor being connected to the second node, the first electrode of the fourth transistor being configured to receive the inverter power voltage, and the second electrode of the fourth transistor being connected to the second control node, and a fifth transistor including a control electrode, a first electrode and a second electrode, the control electrode of the fifth transistor being connected to the first control node, the first electrode of the fifth transistor being configured to receive a second power voltage, and the second electrode of the fifth transistor being connected to the second control node.

In embodiments, the first stage may include a first circuit, the first circuit including a first transistor including a control electrode, a first electrode and a second electrode, the control electrode of the first transistor being configured to receive a vertical start signal, the first electrode of the first transistor being connected to the first control node, and the second electrode of the first transistor being connected to a third control node, and a second transistor including a control electrode, a first electrode and a second electrode, the control electrode of the second transistor being configured to receive the vertical start signal, the first electrode of the second transistor being connected to the third control node, and the second electrode of the second transistor being configured to receive a power voltage.

In embodiments, the first stage may include a first circuit, the first circuit including a first transistor including a control electrode, a first electrode and a second electrode, the control electrode of the first transistor being configured to receive a next carry signal of the next stage, the first electrode of the first transistor being connected to the first control node, and the second electrode of the first transistor being connected to a third control node, and a second transistor including a control electrode, a first electrode and a second electrode, the control electrode of the second transistor being configured to receive the next carry signal, the first electrode of the second transistor being connected to the third control node, and the second electrode of the second transistor being configured to receive a power voltage.

In embodiments, the first stage may include a first circuit, the first circuit including a first transistor including a control electrode, a first electrode and a second electrode, the control electrode of the first transistor being connected to the second control node, the first electrode of the first transistor being connected to the first control node, and the second electrode of the first transistor being connected to a third control node, and a second transistor including a control electrode, a first electrode and a second electrode, the control electrode of the second transistor being connected to the second control node, the first electrode of the second transistor being connected to the third control node, and the second electrode of the second transistor being configured to receive a power voltage.

In embodiments of a gate driving circuit according to the present inventive concepts, the gate driving circuit includes a plurality of stages. A first stage among the plurality of stages may include an output circuit configured to output a plurality of gate signals based on a signal of a first control node and a signal of a second control node, the plurality of gate signals corresponding to a plurality of clock signals, and a compensation circuit connected to the first control node, the compensation circuit including a first compensation transistor including a control electrode, a first electrode and a second electrode the control electrode of the first compensation transistor being connected to the first control node, the first electrode of the first compensation transistor being configured to receive one of a plurality of next clock signals applied to a next stage among the plurality of stages, and the second electrode of the first compensation transistor being connected to a first intermediate node, and a first compensation capacitor including a first electrode and a second electrode, the first electrode of the first compensation capacitor being connected to the first intermediate node, and the second electrode of the first compensation capacitor being connected to the first control node.

In embodiments, the compensation circuit may include a second compensation transistor including a control electrode, a first electrode and a second electrode, the control electrode of the second compensation transistor being connected to the first control node, the first electrode of the second compensation transistor being configured to receive one of a plurality of previous clock signals applied to a previous stage among the plurality of stages, and the second electrode of the second compensation transistor being connected to a second intermediate node, and a second compensation capacitor including a first electrode and a second electrode, the first electrode of the second compensation capacitor being connected to the second intermediate node, and the second electrode of the second compensation capacitor being connected to the first control node.

In embodiments of an electronic apparatus according to the present inventive concepts, the electronic apparatus includes a display panel including a plurality of pixels, a gate driver configured to output a gate signal to a first pixel among the plurality of pixels, a data driver configured to output a data voltage to the first pixel, a driving controller configured to control the gate driver and the data driver, and processing circuitry configured to output input image data and an input control signal to the driving controller, wherein a gate driving circuit of the gate driver includes a plurality of stages, a first stage among the plurality of stages including an output circuit configured to output a plurality of gate signals based on a signal of a first control node and a signal of a second control node, the plurality of gate signals corresponding to a plurality of clock signals, and a first capacitor including a first electrode and a second electrode, the first electrode of the first capacitor being configured to receive one of a plurality of gate signals of a next stage among the plurality of stages, and the second electrode of the first capacitor being connected to the first control node.

According to the gate driving circuit and the electronic apparatus including the gate driving circuit, the present stage may include the compensation circuit receiving one of the clock signals of the next stage or receiving one of the gate signals of the next stage so that the first control node may be bootstrapped. Thus, the falling of the last gate signal of the present stage may not become slow.

In addition, the present stage may include the compensation circuit receiving one of the clock signals of the previous stages or receiving one of the gate signals of the previous stages so that the first control node may be bootstrapped. Thus, the rising of the first gate signal of the present stage or the falling of the last gate signal of the present stage may not become slow.

Therefore, the waveform difference between the plural gate signals may be reduced when the single stage outputs the plural gate signals. Thus, a reliability of the gate driving circuit may be enhanced and a display quality of the display panel may be enhanced.

BRIEF DESCRIPTION OF THE DRAWINGS

The above and other features and advantages of the present inventive concepts will become more apparent by describing in detail embodiments thereof with reference to the accompanying drawings, in which.

DETAILED DESCRIPTION

Hereinafter, the present inventive concepts will be explained in detail with reference to the accompanying drawings.

Figure 1:
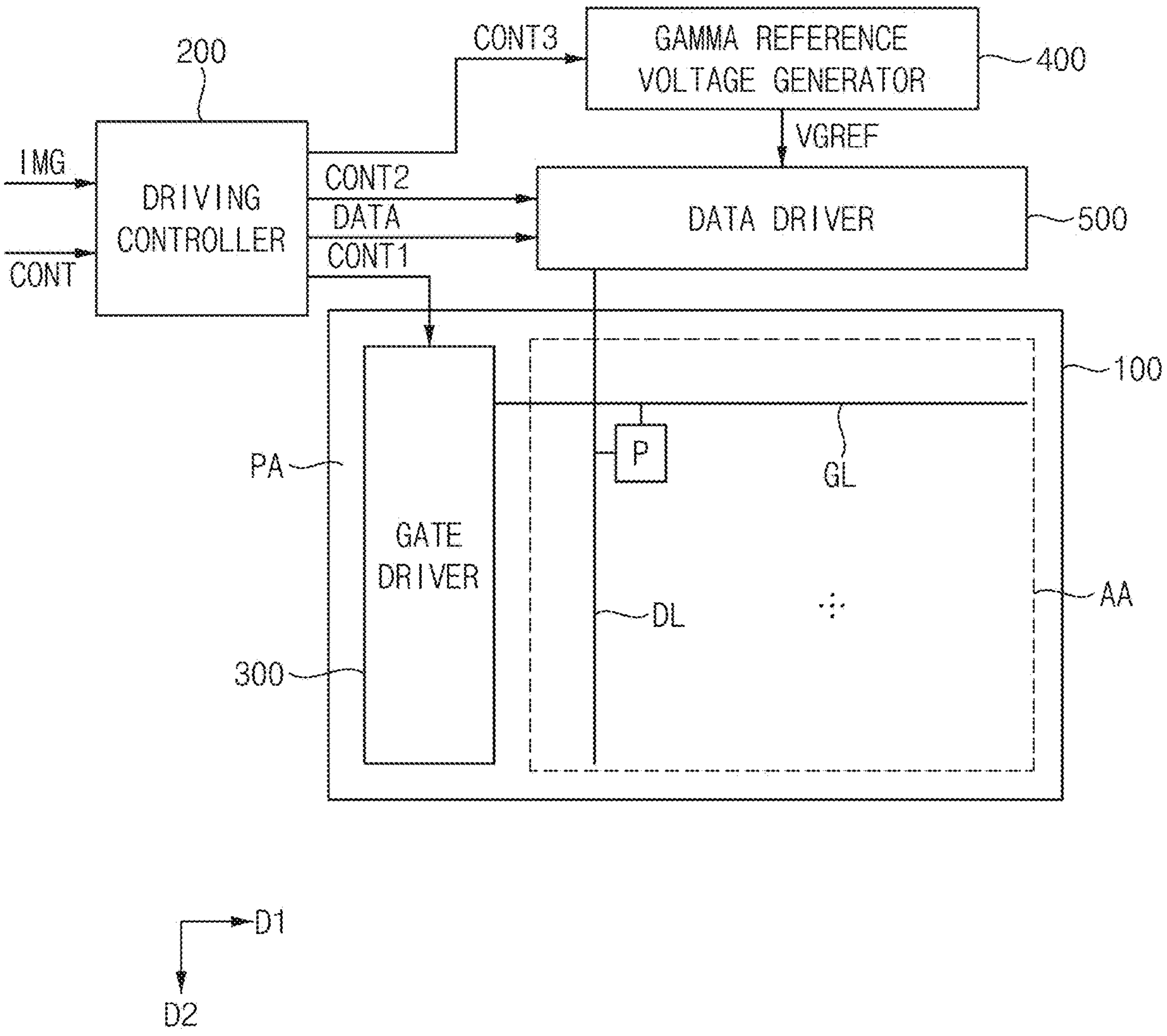
FIG. 1 is a block diagram illustrating a display apparatus according to embodiments of the present inventive concepts.

FIG. 1 is a block diagram illustrating a display apparatus according to embodiments of the present inventive concepts.

Referring to FIG. 1, the display apparatus includes a display panel 100 and a display panel driver. The display panel driver includes a driving controller 200, a gate driver 300, a gamma reference voltage generator 400 and/or a data driver 500.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called to a timing controller embedded data driver (TED).

The display panel 100 has a display region AA on which an image is displayed and a peripheral region PA adjacent to the display region AA.

The display panel 100 includes a plurality of gate lines GL, a plurality of data lines DL and a plurality of pixels connected to the gate lines GL and the data lines DL. The gate lines GL may extend in a first direction D1 and the data lines DL may extend in a second direction D2 crossing (e.g., perpendicular to) the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a gate control signal CONT1, a data control signal CONT2, a gamma control signal CONT3 and a data signal DATA based on the input image data IMG and the input control signal CONT.

The driving controller 200 generates the gate control signal CONT1 for controlling an operation of the gate driver 300 based on the input control signal CONT, and outputs the gate control signal CONT1 to the gate driver 300. The gate control signal CONT1 may include a vertical start signal and a gate clock signal.

The driving controller 200 generates the data control signal CONT2 for controlling an operation of the data driver 500 based on the input control signal CONT, and outputs the data control signal CONT2 to the data driver 500. The data control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the gamma control signal CONT3 for controlling an operation of the gamma reference voltage generator 400 based on the input control signal CONT, and outputs the gamma control signal CONT3 to the gamma reference voltage generator 400.

The gate driver 300 generates gate signals driving the gate lines GL in response to the gate control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF in response to the gamma control signal CONT3 received from the driving controller 200. The gamma reference voltage generator 400 provides the gamma reference voltage VGREF to the data driver 500.

In embodiments, the gamma reference voltage generator 400 may be disposed in the driving controller 200, or in the data driver 500.

The data driver 500 receives the data control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
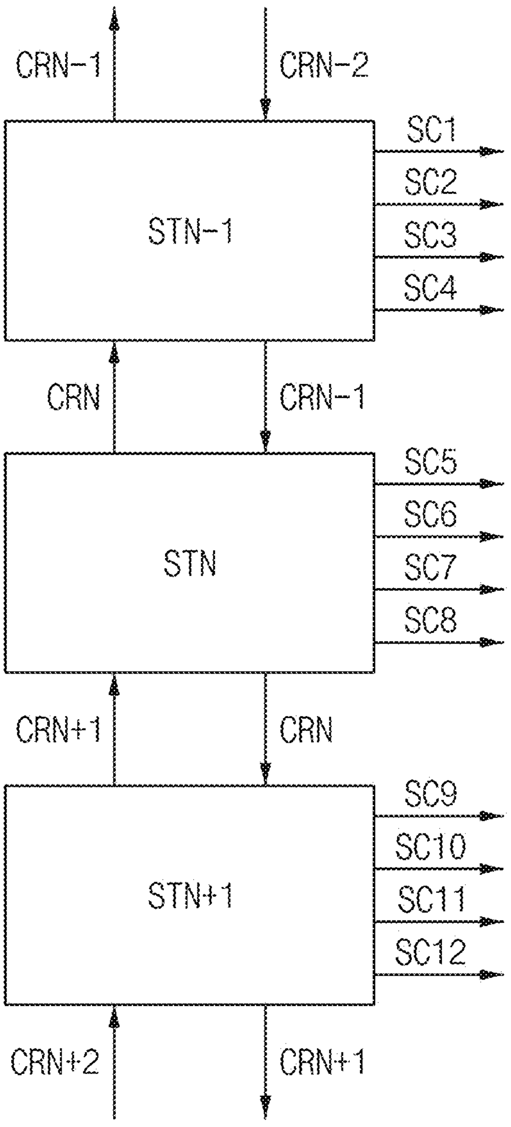
FIG. 2 is a block diagram illustrating a gate driver of FIG. 1.
Figure 3:
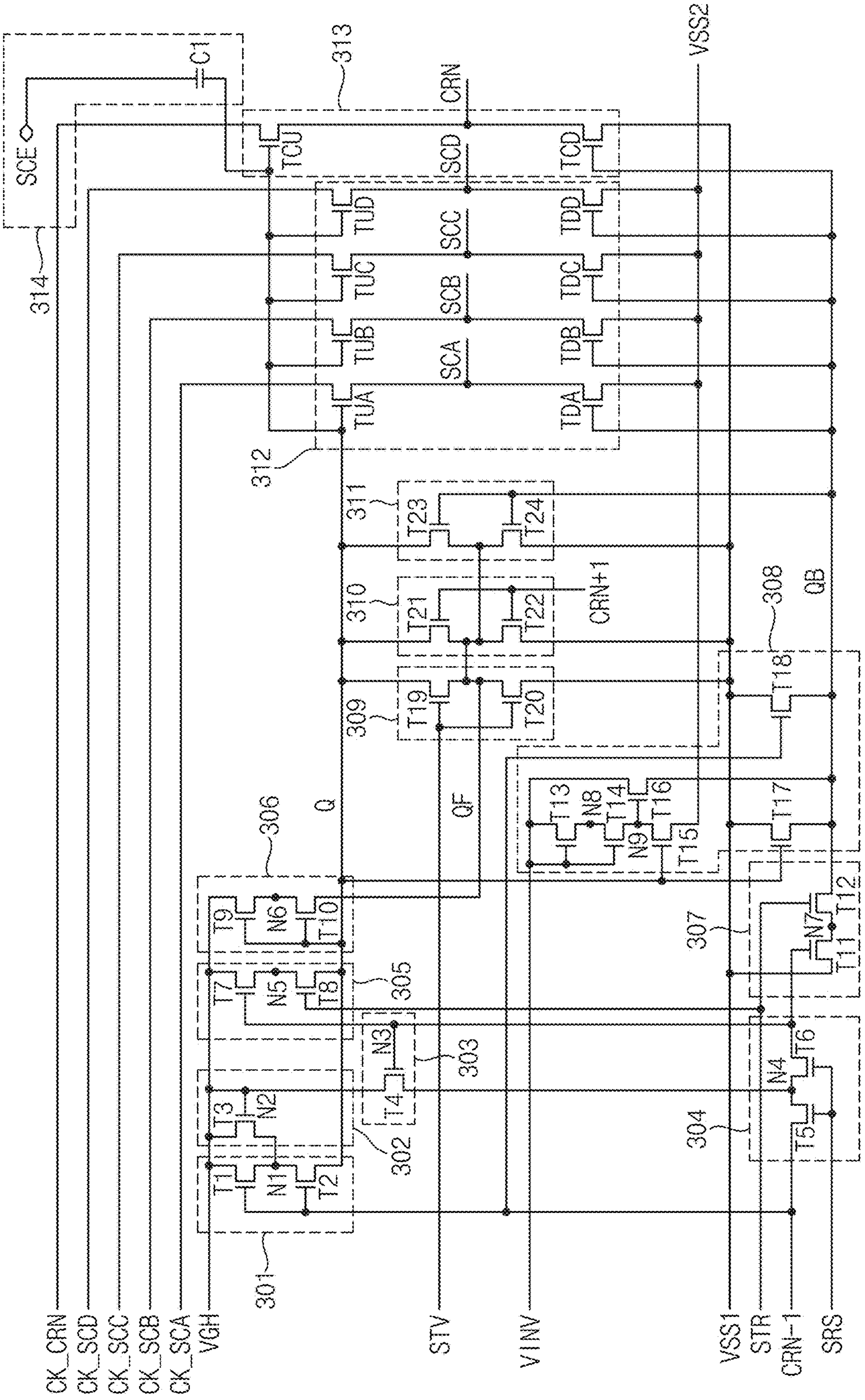
FIG. 3 is a circuit diagram illustrating a present stage of FIG. 2.
Figure 4:
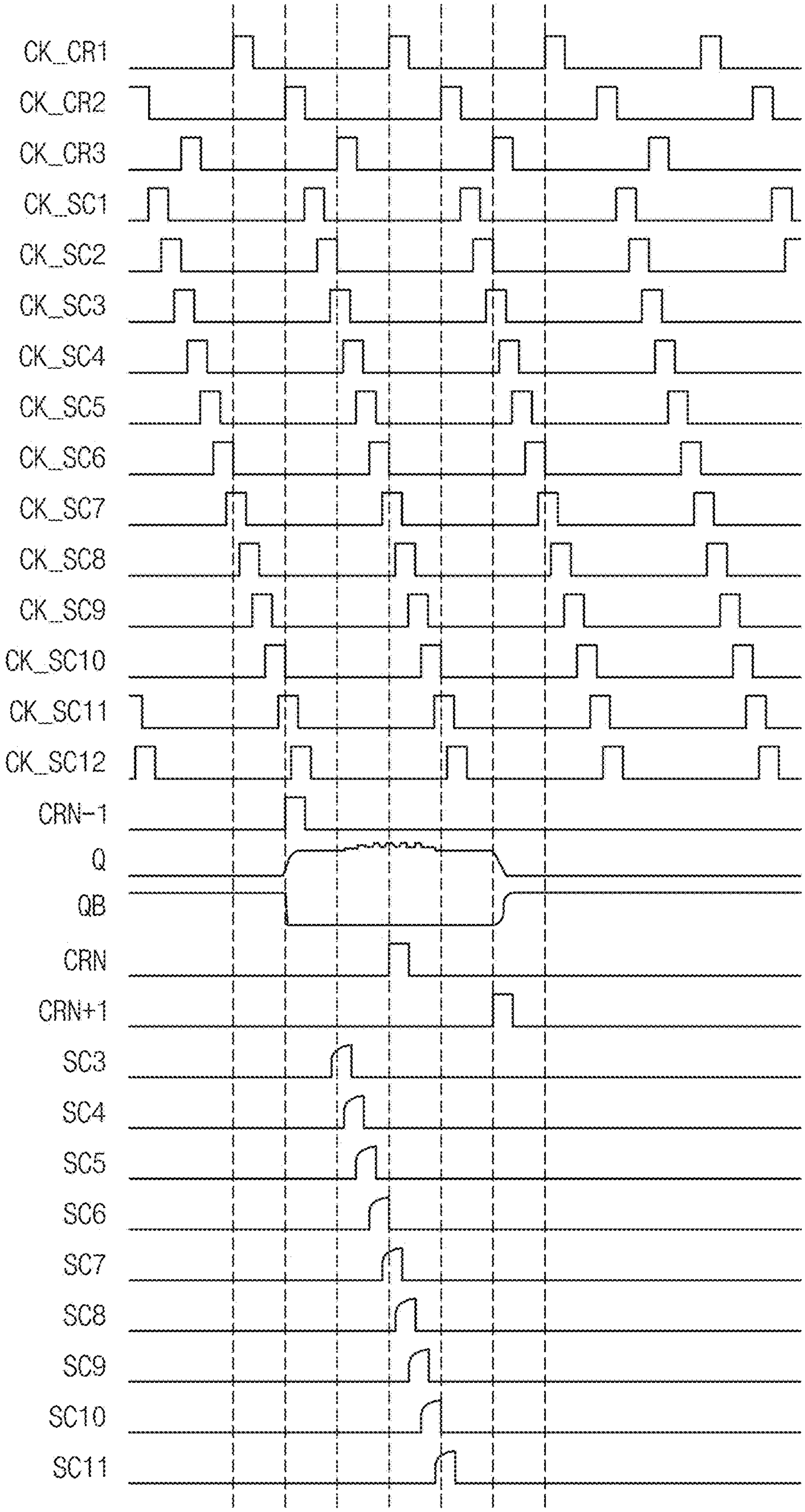
FIG. 4 is a timing diagram illustrating an input signal, a node signal and an output signal of the gate driver of FIG. 1.

FIG. 2 is a block diagram illustrating the gate driver 300 of FIG. 1. FIG. 3 is a circuit diagram illustrating a present stage of FIG. 2. FIG. 4 is a timing diagram illustrating an input signal, a node signal and an output signal of the gate driver 300 of FIG. 1.

Referring to FIGS. 1 to 4, a gate driving circuit of the gate driver 300 includes a plurality of stages STN−1, STN and STN+1. Although only three stages STN−1, STN and STN+1 are illustrated in FIG. 2 for convenience of explanation, the gate driving circuit may include many more stages than three.

Herein, a single stage (e.g., each of the plurality of stages STN−1, STN and STN+1) may output a plurality of gate signals having different phases. For example, the single stage may output two gate signals having different phases. For example, the single stage may output four gate signals having different phases. For example, the single stage may output six gate signals having different phases. For example, the single stage may output eight gate signals having different phases.

In the present example, a case in which the single stage outputs four gate signals having different phases is explained.

In FIG. 2, for example, an N−1-th stage STN−1 may output first to fourth gate signals SC1, SC2, SC3 and SC4. For example, an N-th stage STN may output fifth to eighth gate signals SC5, SC6, SC7 and SC8. For example, an N+1-th stage STN+1 may output ninth to twelfth gate signals SC9, SC10, SC11 and SC12.

A present stage (may also be referred to herein as a first stage) may receive a previous carry signal from a previous stage and may output a present carry signal to a next stage. In addition, the present stage may receive a next carry signal from the next stage and may output the present carry signal to the previous stage.

For example, the N−1-th stage STN−1 may output an N−1-th carry signal CRN−1 to a previous stage (not shown) of the N−1-th stage STN−1 and may receive an N−2-th carry signal CRN−2 from the previous stage of the N−1-th stage STN−1. For example, the N−1-th stage STN−1 may output the N−1-th carry signal CRN−1 to the N-th stage STN which is a next stage of the N−1-th stage STN−1 and may receive an N-th carry signal CRN from the N-th stage STN.

For example, the N-th stage STN may output the N-th carry signal CRN to the N−1-th stage which is a previous stage of the N-th stage STN and may receive the N−1-th carry signal CRN−1 from the N−1-th stage STN−1. For example, the N-th stage STN may output the N-th carry signal CRN to the N+1-th stage STN+1 which is a next stage of the N-th stage STN and may receive an N+1-th carry signal CRN+1 from the N+1-th stage STN+1.

For example, the N+1-th stage STN+1 may output the N+1-th carry signal CRN+1 to the N-th stage which is a previous stage of the N+1-th stage STN+1 and may receive the N-th carry signal CRN from the N-th stage STN. For example, the N+1-th stage STN+1 may output the N+1-th carry signal CRN+1 to a next stage (not shown) of the N+1-th stage STN+1 and may receive an N+2-th carry signal CRN+2 from the next stage of the N+1-th stage STN+1.

Although the present stage outputs and receives the carry signals with the right (e.g., directly or immediately) previous stage and the right (e.g., directly or immediately) next stage in FIG. 2, the present inventive concepts may not be limited thereto. Alternatively, the present stage may output and receive the carry signals with at least one of previous stages and may output and receive the carry signals with at least one of next stages.

The present stage among the plurality of stages may include an output circuit 312 outputting a plurality of gate signals SCA, SCB, SCC and SCD corresponding to a plurality of clock signals CK_SCA, CK_SCB, CK_SCC and CK_SCD based on a signal of a first control node Q and a signal of a second control node QB and a compensation circuit 314 connected to the first control node Q of the present stage.

In the present example, the compensation circuit 314 may include a first capacitor C1 including a first electrode receiving one (e.g. SCE) of a plurality of gate signals of a next stage among the plurality of stages and a second electrode connected to the first control node Q of the present stage.

In the present example, the first electrode of the first capacitor C1 may receive a first gate signal SCE (may also be referred to herein as an earliest gate signal) among the plurality of gate signals of the next stage.

In FIG. 4, for example, the gate driving circuit may output gate signals based on twelve clock signals CK_SC1 to CK_SC12 having different phases and may output carry signals based on three carry clock signals CK_CR1 to CK_CR3 having different phases.

A single stage may output four gate signals having different phases and one carry signal.

In FIG. 4, a present stage may output four gate signals SC5, SC6, SC7 and SC8 based on fifth to eighth clock signals CK_SC5 to CK_SC8.

In FIG. 4, the first gate signal among the plurality of gate signals of the next stage applied to the first electrode of the first capacitor C1 may be SC9.

The output circuit 312 may include a first output transistor TUA including a control electrode connected to the first control node Q, a first electrode receiving a first clock signal CK_SCA and a second electrode connected to a first output node, a second output transistor TDA including a control electrode connected to the second control node QB, a first electrode receiving a third power voltage VSS2 and a second electrode connected to the first output node, a third output transistor TUB including a control electrode connected to the first control node Q, a first electrode receiving a second clock signal CK_SCB and a second electrode connected to a second output node and a fourth output transistor TDB including a control electrode connected to the second control node QB, a first electrode receiving the third power voltage VSS2 and a second electrode connected to the second output node.

The output circuit 312 may further include a fifth output transistor TUC including a control electrode connected to the first control node Q, a first electrode receiving a third clock signal CK_SCC and a second electrode connected to a third output node and a sixth output transistor TDC including a control electrode connected to the second control node QB, a first electrode receiving the third power voltage VSS2 and a second electrode connected to the third output node.

The output circuit 312 may further include a seventh output transistor TUD including a control electrode connected to the first control node Q, a first electrode receiving a fourth clock signal CK_SCD and a second electrode connected to a fourth output node and an eighth output transistor TDD including a control electrode connected to the second control node QB, a first electrode receiving the third power voltage VSS2 and a second electrode connected to the fourth output node.

The first output transistor TUA, the third output transistor TUB, the fifth output transistor TUC and the seventh output transistor TUD may be buffer transistors outputting the gate signals SCA, SCB, SCC and SCD.

The second output transistor TDA, the fourth output transistor TDB, the sixth output transistor TDC and the eighth output transistor TDD may be transistors holding voltages of the gate signals SCA, SCB, SCC and SCD to the third power voltage VSS2.

The present stage may further include a carry circuit 313. The carry circuit 313 may generate the carry signal CRN.

For example, the carry circuit 313 may include a first carry transistor TCU including a control electrode connected to the first control node Q, a first electrode receiving a carry clock signal CK_CRN and a second electrode connected to a carry output node, a second carry transistor TCD including a control electrode connected to the second control node QB, a first electrode receiving a second power voltage VSS1 and a second electrode connected to the carry output node.

For example, the third power voltage VSS2 may be less than the second power voltage VSS1.

The present stage may further include a first circuit 301, a second circuit 302, a third circuit 303, a fourth circuit 304, a fifth circuit 305, a sixth circuit 306, a seventh circuit 307, an eighth circuit 308, a ninth circuit 309, a tenth circuit 310 and/or an eleventh circuit 311.

The first circuit 301 may charge the first control node Q to a first power voltage VGH in response to a previous carry signal CRN−1 of a previous stage among the plurality of stages.

For example, the first circuit 301 may include a first transistor T1 including a control electrode receiving the previous carry signal CRN−1, a first electrode receiving the first power voltage VGH and a second electrode connected to a first node N1, and a second transistor T2 including a control electrode receiving the previous carry signal CRN−1, a first electrode connected to the first node N1 and a second electrode connected to the first control node Q.

For example, the first power voltage VGH may be greater than the second power voltage VSS1 and the third power voltage VSS2.

The second circuit 302 may maintain a voltage of the first node N1 to the first power voltage VGH to prevent (or reduce) a leakage of the first circuit 301.

For example, the second circuit 302 may include a third transistor T3 including a control electrode receiving the first power voltage VGH, a first electrode receiving the first power voltage VGH and a second electrode connected to the first node N1. The control electrode of the third transistor T3 may be connected to a second node N2 and the first power voltage VGH may be applied to the second node N2.

The third circuit 303, the fourth circuit 304, the fifth circuit 305 and/or the seventh circuit 307 may be circuits for sensing operation in a blank period.

When the present stage is a sensing target, the fourth circuit 304 charges the previous carry signal CRN−1 to a third node N3 in response to a first control signal SRS.

For example, the fourth circuit 304 may include a fifth transistor T5 including a control electrode receiving the first control signal SRS, a first electrode receiving the previous carry signal CRN−1 and a second electrode connected to a fourth node N4, and a sixth transistor T6 including a control electrode receiving the first control signal SRS, a first electrode connected to the fourth node N4 and a second electrode connected to the third node N3.

When the present stage is the sensing target, the third circuit 303 may apply the first power voltage VGH to the fourth node N4 so that a leakage of a signal of the third node N3 may be prevented (or reduced).

For example, the third circuit 303 may include a fourth transistor T4 including a control electrode connected to the third node N3, a first electrode receiving the first power voltage VGH and a second electrode connected to the fourth node N4.

When the present stage is the sensing target and a second control signal STR has an active level in the blank period, the fifth circuit 305 may charge the first control node Q in response to an active level of the third node N3.

For example, the fifth circuit 305 may include a seventh transistor T7 including a control electrode connected to the third node N3, a first electrode receiving the first power voltage VGH and a second electrode connected to a fifth node N5, and an eighth transistor T8 including a control electrode receiving the second control signal STR, a first electrode connected to the fifth node N5 and a second electrode connected to the first control node Q.

The sixth circuit 306 may apply the first power voltage VGH to a third control node QF to prevent (or reduce) a leakage of a signal of the first control node Q when the first control node Q has an active level.

For example, the sixth circuit 306 may include a ninth transistor T9 including a control electrode connected to the first control node Q, a first electrode receiving the first power voltage VGH and a second electrode connected to a sixth node N6, and a tenth transistor T10 including a control electrode connected to the first control node Q, a first electrode connected to the sixth node N6 and a second electrode connected to the third control node QF.

When the present stage is the sensing target, the seventh circuit 307 may apply the second power voltage VSS1 to the second control node QB in response to the second control signal STR.

For example, the seventh circuit 307 may include an eleventh transistor T11 including a control electrode connected to the third node N3, a first electrode receiving the second power voltage VSS1 and a second electrode connected to a seventh node N7, and a twelfth transistor T12 including a control electrode receiving the second control signal STR, a first electrode connected to the seventh node N7 and a second electrode connected to the second control node QB.

The eighth circuit 308 may be an inverter circuit receiving an inverter power voltage VINV and the second power voltage VSS1 and generating a signal having a waveform substantially opposite to a waveform of the signal of the first control node Q.

For example, the eighth circuit 308 may include a thirteenth transistor T13 including a control electrode receiving the inverter power voltage VINV, a first electrode receiving the inverter power voltage VINV and a second electrode connected to an eighth node N8, a fourteenth transistor T14 including a control electrode receiving the inverter power voltage VINV, a first electrode connected to the eighth node N8 and a second electrode connected to a ninth node N9, a fifteenth transistor T15 including a control electrode connected to the first control node Q, a first electrode connected to the ninth node N9 and a second electrode receiving the third power voltage VSS2, a sixteenth transistor T16 including a control electrode connected to the ninth node N9, a first electrode receiving the inverter power voltage VINV and a second electrode connected to the second control node QB, and a seventeenth transistor T17 including a control electrode connected to the first control node Q, a first electrode receiving the second power voltage VSS1 and a second electrode connected to the second control node QB. The eighth circuit 308 may further include an eighteenth transistor T18 including a control electrode receiving the previous carry signal CRN−1, a first electrode receiving the second power voltage VSS1 and a second electrode connected to the second control node QB.

The ninth circuit 309 may receive a vertical start signal STV and initialize the first control node Q at a starting point of every frame.

For example, the ninth circuit 309 may include a nineteenth transistor T19 including a control electrode receiving the vertical start signal STV, a first electrode connected to the first control node Q and a second electrode connected to the third control node QF, and a twentieth transistor T20 including a control electrode receiving the vertical start signal STV, a first electrode connected to the third control node QF and a second electrode receiving the second power voltage VSS1.

The tenth circuit 310 may receive a next carry signal CRN+1 of a next stage among the plurality of stages and initialize the first control node Q after the output circuit outputs the plurality of gate signals.

For example, the tenth circuit 310 may include a twenty first transistor T21 including a control electrode receiving the next carry signal CRN+1, a first electrode connected to the first control node Q and a second electrode connected to the third control node QF, and a twenty second transistor T22 including a control electrode receiving the next carry signal CRN+1, a first electrode connected to the third control node QF and a second electrode receiving the second power voltage VSS1.

The eleventh circuit 311 may apply the second power voltage VSS1 to the first control node Q when a signal of the second control node QB has an active level.

For example, the eleventh circuit 311 may include a twenty third transistor T23 including a control electrode connected to the second control node QB, a first electrode connected to the first control node Q and a second electrode connected to the third control node QF, and a twenty fourth transistor T24 including a control electrode connected to the second control node QB, a first electrode connected to the third control node QF and a second electrode receiving the second power voltage VSS1.

Figure 5A:
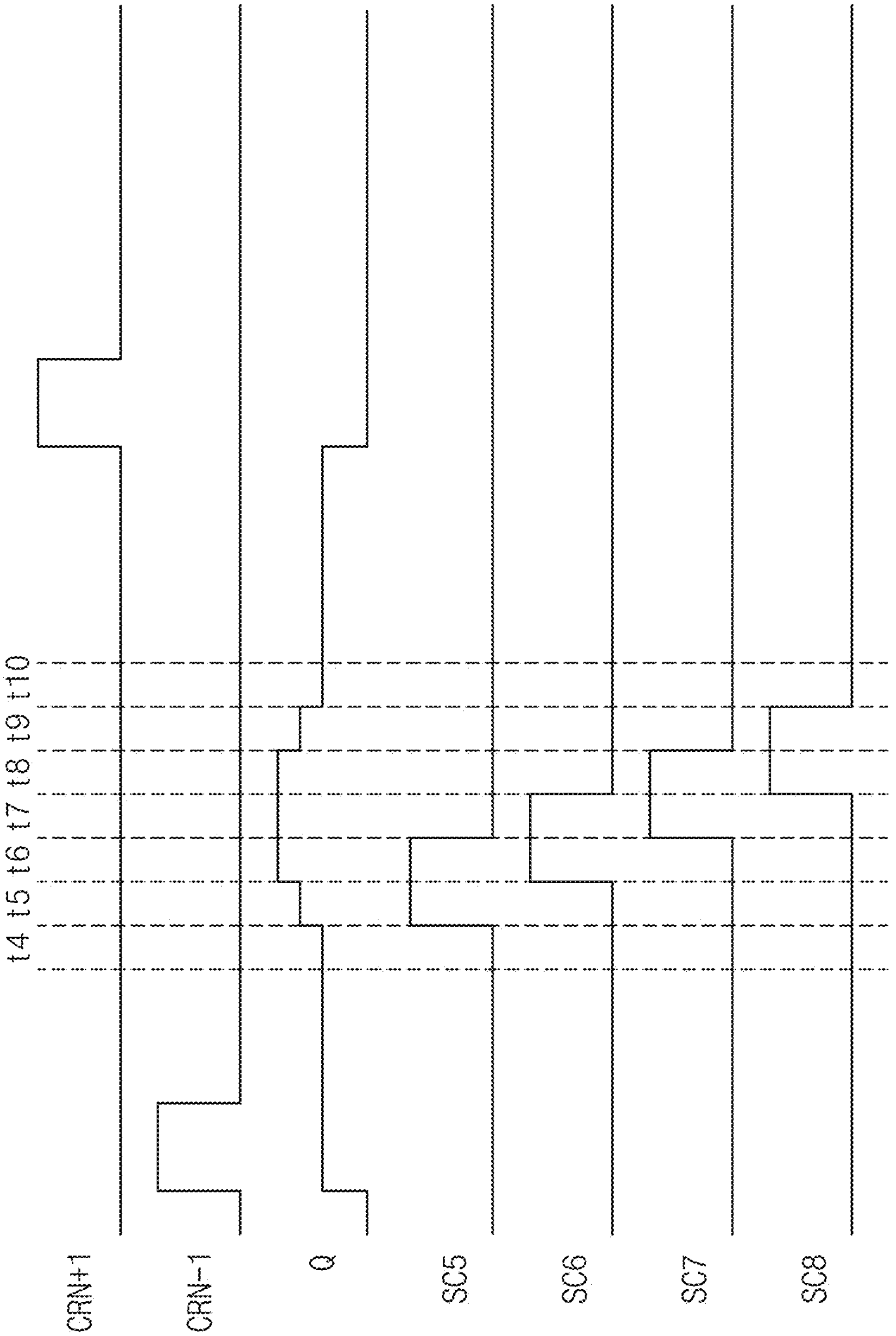
FIG. 5A is a timing diagram illustrating a previous carry signal, a next carry signal, a signal of a first control node and plural gate signals of a present stage according to a comparative example.
Figure 5B:
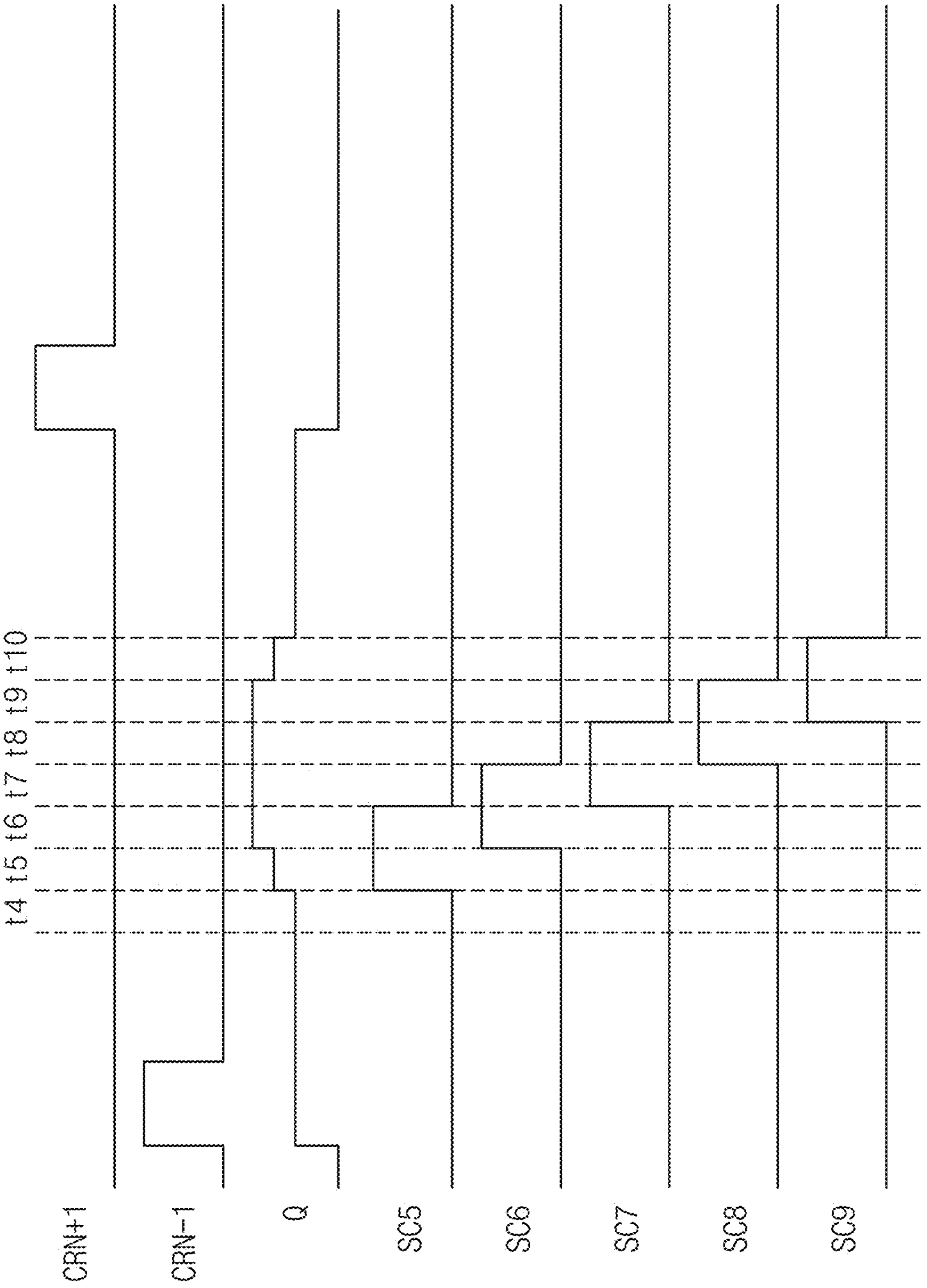
FIG. 5B is a timing diagram illustrating a previous carry signal, a next carry signal, a signal of a first control node and plural gate signals of the present stage of FIG. 3.
Figure 5C:
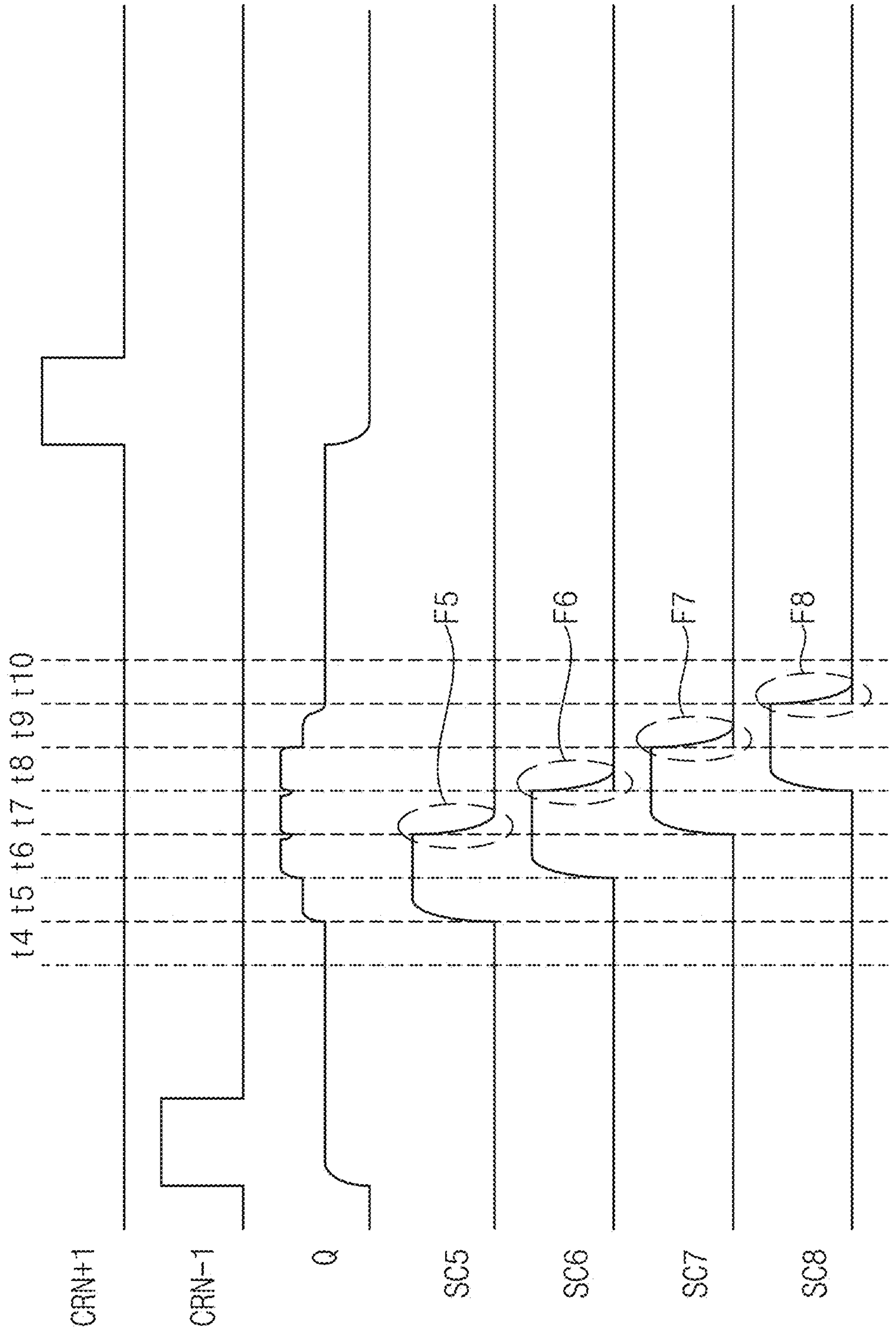
FIG. 5C is a timing diagram illustrating the previous carry signal, the next carry signal, the signal of the first control node and the plural gate signals of the present stage according to the comparative example.
Figure 5D:
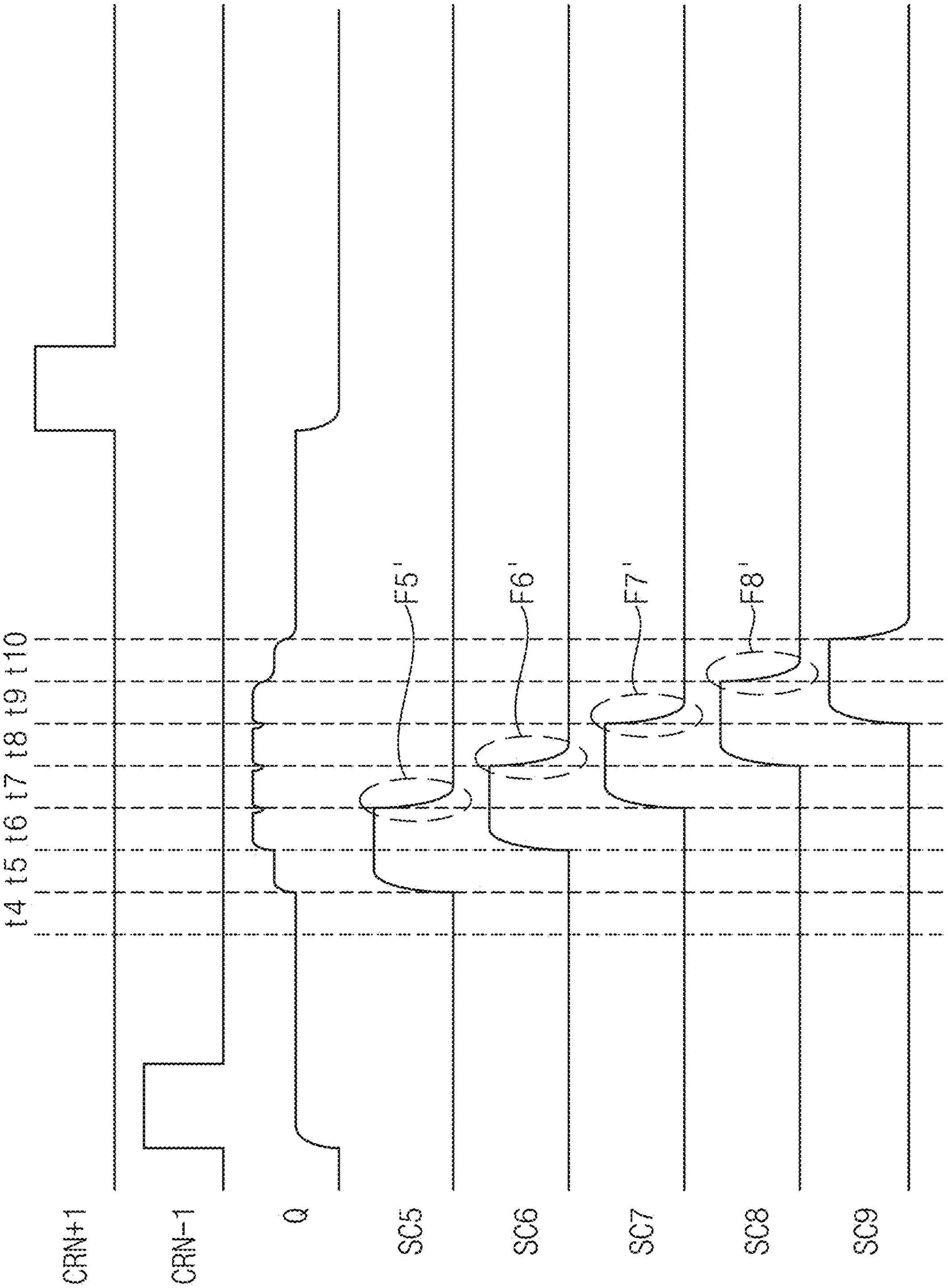
FIG. 5D is a timing diagram illustrating the previous carry signal, the next carry signal, the signal of the first control node and the plural gate signals of the present stage of FIG. 3.

FIG. 5A is a timing diagram illustrating a previous carry signal, a next carry signal, a signal of a first control node and plural gate signals of a present stage according to a comparative example. FIG. 5B is a timing diagram illustrating a previous carry signal, a next carry signal, a signal of a first control node and plural gate signals of the present stage of FIG. 3. FIG. 5C is a timing diagram illustrating the previous carry signal, the next carry signal, the signal of the first control node and the plural gate signals of the present stage according to the comparative example. FIG. 5D is a timing diagram illustrating the previous carry signal, the next carry signal, the signal of the first control node and the plural gate signals of the present stage of FIG. 3.

FIGS. 5A and 5C are timing diagrams illustrating the previous carry signal CRN−1, the next carry signal CRN+1, the signal of the first control node Q and the plural gate signals SC5 to SC8 of the present stage of the comparative example. In FIG. 5A, the signal of the first control node Q and the plural gate signals SC5 to SC8 are conceptually illustrated as square waveforms for convenience of explanation. In FIG. 5C, the signal of the first control node Q and the plural gate signals SC5 to SC8 are realistically illustrated as simulation waveforms.

FIGS. 5B and 5D are timing diagrams illustrating the previous carry signal CRN−1, the next carry signal CRN+1, the signal of the first control node Q and the plural gate signals SC5 to SC8 of the present stage of the present example. In FIG. 5B, the signal of the first control node Q and the plural gate signals SC5 to SC8 are conceptually illustrated as square waveforms for convenience of explanation. In FIG. 5D, the signal of the first control node Q and the plural gate signals SC5 to SC8 are realistically illustrated as simulation waveforms.

In the comparative example of FIGS. 5A and 5C, the present stage may not include the compensation circuit 314 of FIG. 3. In contrast, in the present example of FIGS. 5B and 5D, the present stage may include the compensation circuit 314 for further bootstrapping the first control node Q.

Although not shown in figures, the first control node Q may be bootstrapped by internal capacitances of the first, third, fifth and seventh output transistors TUA, TUB, TUC and TUD, or additional capacitors formed between the first, second, third and fourth output nodes and the first control node Q.

In FIGS. 5A to 5D, for example, the present stage may output fifth to eighth gate signals SC5, SC6, SC7 and SC8.

As shown in FIGS. 5A and 5C, the fifth gate signal SC5 is a first gate signal of the present stage, the sixth gate signal SC6 is a second gate signal of the present stage, the seventh gate signal SC7 is a third gate signal of the present stage and the eighth gate signal SC8 is a fourth gate signal of the present stage.

In a fifth period t5 in which the fifth gate signal SC5 starts to be output, another gate signal overlapping the fifth gate signal SC5 may not be generated in the present stage and a clock signal overlapping the fifth gate signal SC5 may not be applied to the present stage. Thus, a bootstrap degree of the first control node Q may be relatively low and an average level of the signal of the first control node Q may be relatively low in a period t5 and t6 in which the fifth gate signal SC5 is output.

In a sixth period t6 in which the sixth gate signal SC6 starts to be output, another gate signal SC5 overlapping the sixth gate signal SC6 may be generated in the present stage and a clock signal CR_SC5 overlapping the sixth gate signal SC6 may be applied to the present stage. In addition, in a seventh period t7 in which the output of the sixth gate signal SC6 continues, another gate signal SC7 overlapping the sixth gate signal SC6 may be generated in the present stage and a clock signal CR_SC7 overlapping the sixth gate signal SC6 may be applied to the present stage. Thus, a bootstrap degree of the first control node Q may be relatively high and an average level of the signal of the first control node Q may be relatively high in a period t6 and t7 in which the sixth gate signal SC6 is output.

In a seventh period t7 in which the seventh gate signal SC7 starts to be output, another gate signal SC6 overlapping the seventh gate signal SC7 may be generated in the present stage and a clock signal CR_SC6 overlapping the seventh gate signal SC7 may be applied to the present stage. In addition, in an eighth period t8 in which the output of the seventh gate signal SC7 continues, another gate signal SC8 overlapping the seventh gate signal SC7 may be generated in the present stage and a clock signal CR_SC8 overlapping the seventh gate signal SC7 may be applied to the present stage. Thus, a bootstrap degree of the first control node Q may be relatively high and an average level of the signal of the first control node Q may be relatively high in a period t7 and t8 in which the seventh gate signal SC7 is output.

In an eighth period t8 in which the eighth gate signal SC8 starts to be output, another gate signal SC7 overlapping the eighth gate signal SC8 may be generated in the present stage and a clock signal CR_SC7 overlapping the eighth gate signal SC8 may be applied to the present stage. However, in a ninth period t9 in which the output of the eighth gate signal SC8 continues, another gate signal overlapping the eighth gate signal SC8 may not be generated in the present stage and a clock signal overlapping the eighth gate signal SC8 may not be applied to the present stage. Thus, a bootstrap degree of the first control node Q may be relatively low and an average level of the signal of the first control node Q may be relatively low in a period t8 and t9 in which the eighth gate signal SC8 is output.

Thus, a falling time F6 of the sixth gate signal SC6 and a falling time F7 of the seventh gate signal SC7 may be relatively short. In contrast, a falling time F8 of the eighth gate signal SC8 may be longer than the falling time F6 of the sixth gate signal SC6 and the falling time F7 of the seventh gate signal SC7.

In addition, a falling time F5 of the fifth gate signal SC5 may be longer than the falling time F6 of the sixth gate signal SC6 and the falling time F7 of the seventh gate signal SC7. However, the falling time F5 of the fifth gate signal SC5 may be shorter than the falling time F8 of the eighth gate signal SC8.

In addition, a rising time of the fifth gate signal SC5 may be longer than a rising time of the sixth gate signal SC6, a rising time of the seventh gate signal SC7 and a rising time of the eighth gate signal SC8.

Regarding the falling time, the eighth gate signal SC8 may be the worst case (the longest case) among the fifth to eighth gate signals SC5 to SC8. Regarding the rising time, the fifth gate signal SC5 may be the worst case (the longest case) among the fifth to eighth gate signals SC5 to SC8.

As explained above, when the waveforms of the gate signals output from one stage are different from one another, charging amounts of the pixels may vary for the gate lines so that a horizontal line display defect may occur.

In particular, a longer falling time F8 of the eighth gate signal SC8 may have a negative effect on a display quality of the display panel 100.

In the present example, the compensation circuit 314 may include a first capacitor C1 including a first electrode receiving a first gate signal (SC9 of FIGS. 5B and 5D) among plural gate signals of the next stage and a second electrode connected to the first control node Q of the present stage.

In FIGS. 5B and 5D, in an eighth period t8 in which the eighth gate signal SC8 starts to be output, another gate signal SC7 overlapping the eighth gate signal SC8 may be generated in the present stage and a clock signal CR_SC7 overlapping the eighth gate signal SC8 may be applied to the present stage. In addition, in a ninth period t9 in which the output of the eighth gate signal SC8 continues, the first control node Q may be bootstrapped using a ninth gate signal SC9 of the next stage overlapping the eighth gate signal SC8. Thus, a bootstrap degree of the first control node Q may be relatively increased and an average level of the signal of the first control node Q may be relatively increased in a period t8 and t9 in which the eighth gate signal SC8 is output.

In FIG. 5D, falling times of the fifth gate signal SC5 to the eighth gate signal SC8 may be F5', F6', F7' and F8', respectively. F5', F6' and F7' in FIG. 5D may be substantially the same as F5, F6 and F7 in FIG. 5C. In contrast, F8' in FIG. 5D may be shorter than F8 in FIG. 5C. F8' in FIG. 5D may be substantially the same as F6' and F7' in FIG. 5D.

Therefore, the waveform difference between the plural gate signals SC5, SC6, SC7 and SC8 from the single stage may be reduced.

According to the present example, the present stage may include the compensation circuit 314 receiving one SC9 of the gate signals of the next stage so that the first control node Q may be bootstrapped. Thus, the falling of the last gate signal SC8 of the present stage may not become slow.

Therefore, the waveform difference between the plural gate signals may be reduced when the single stage outputs the plural gate signals. Thus, a reliability of the gate driving circuit may be enhanced and the display quality of the display panel 100 may be enhanced.

Figure 6:
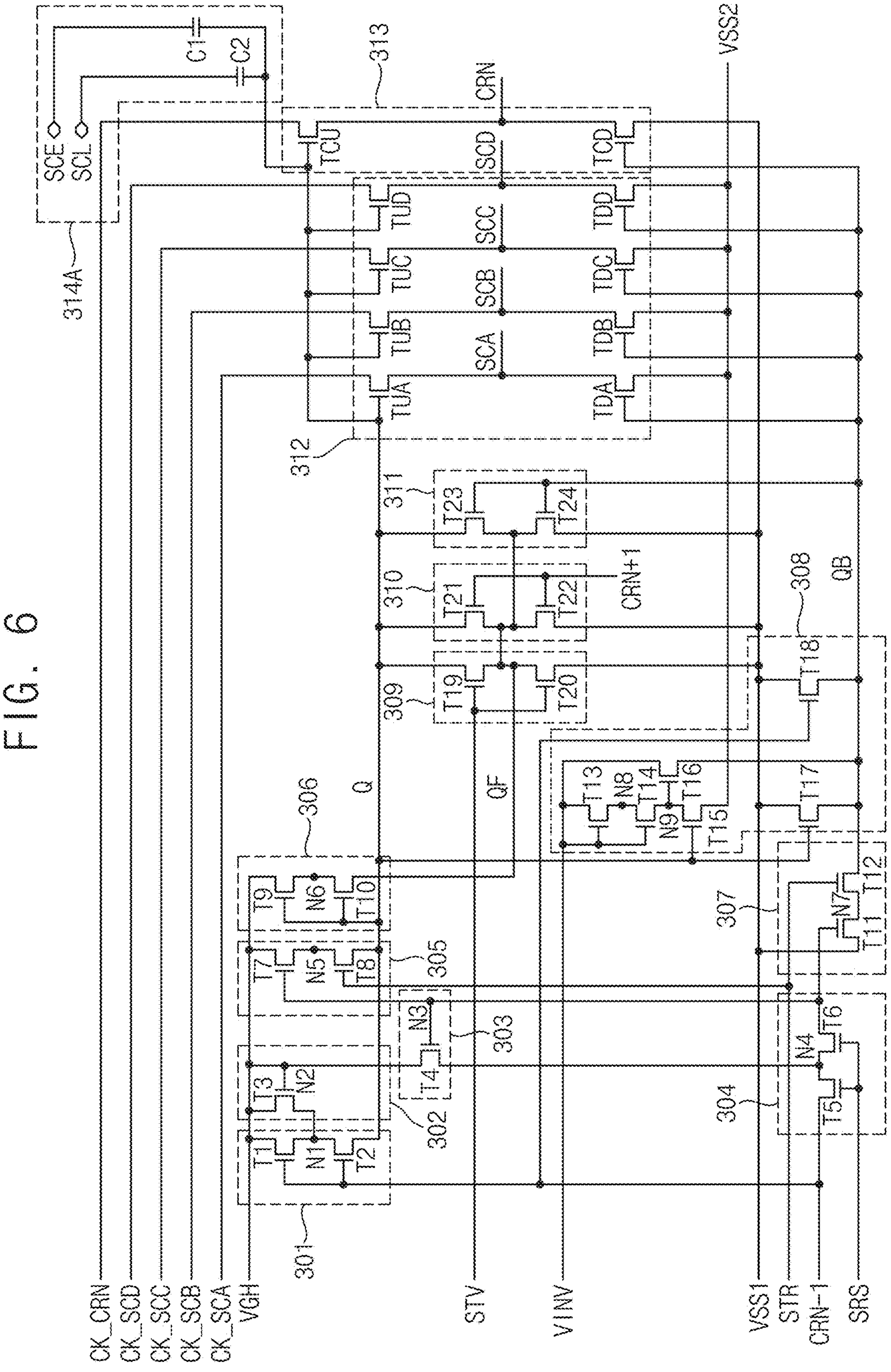
FIG. 6 is a circuit diagram illustrating a present stage of a display apparatus according to embodiments of the present inventive concepts.
Figure 7A:
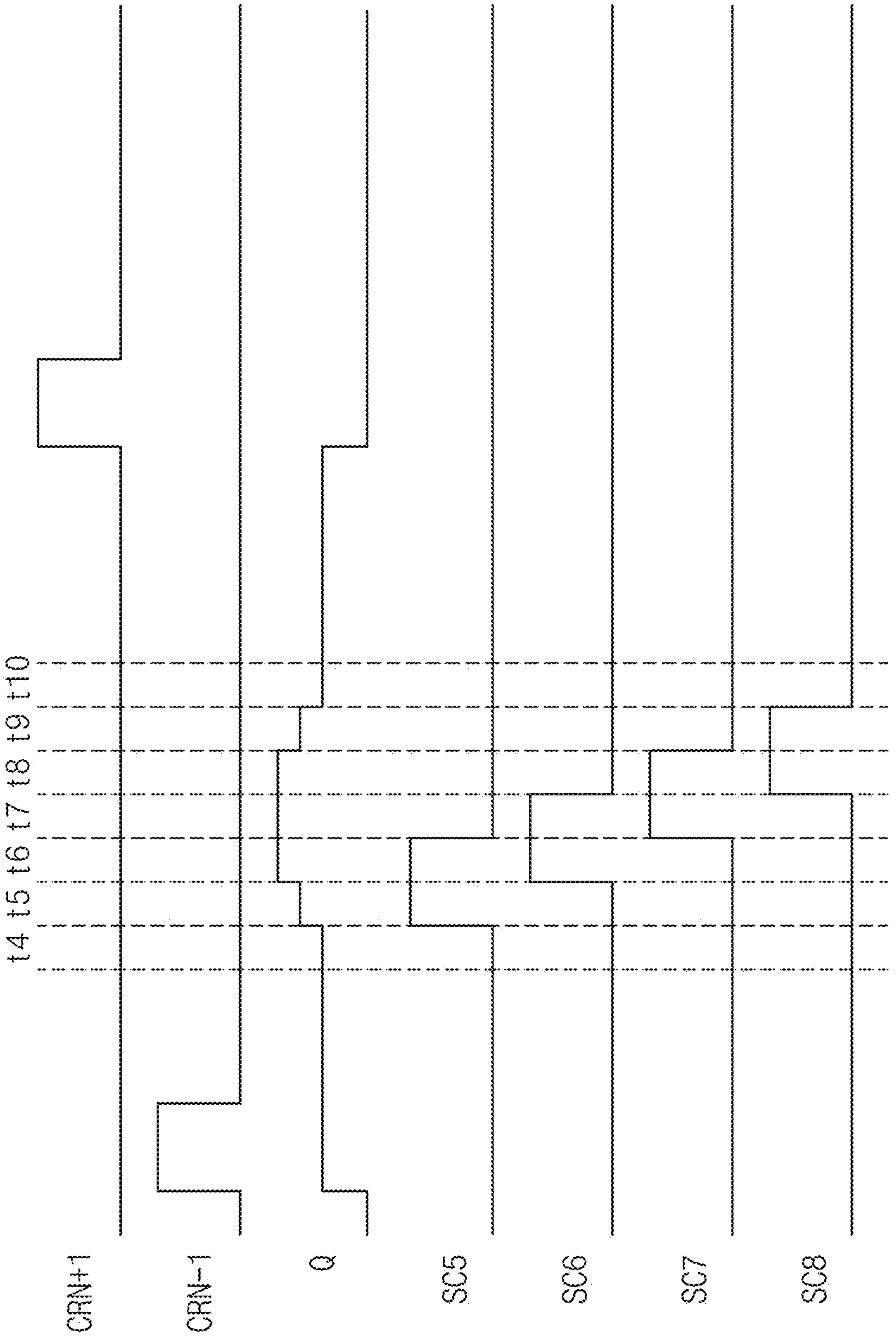
FIG. 7A is a timing diagram illustrating a previous carry signal, a next carry signal, a signal of a first control node and plural gate signals of a present stage according to a comparative example.
Figure 7B:
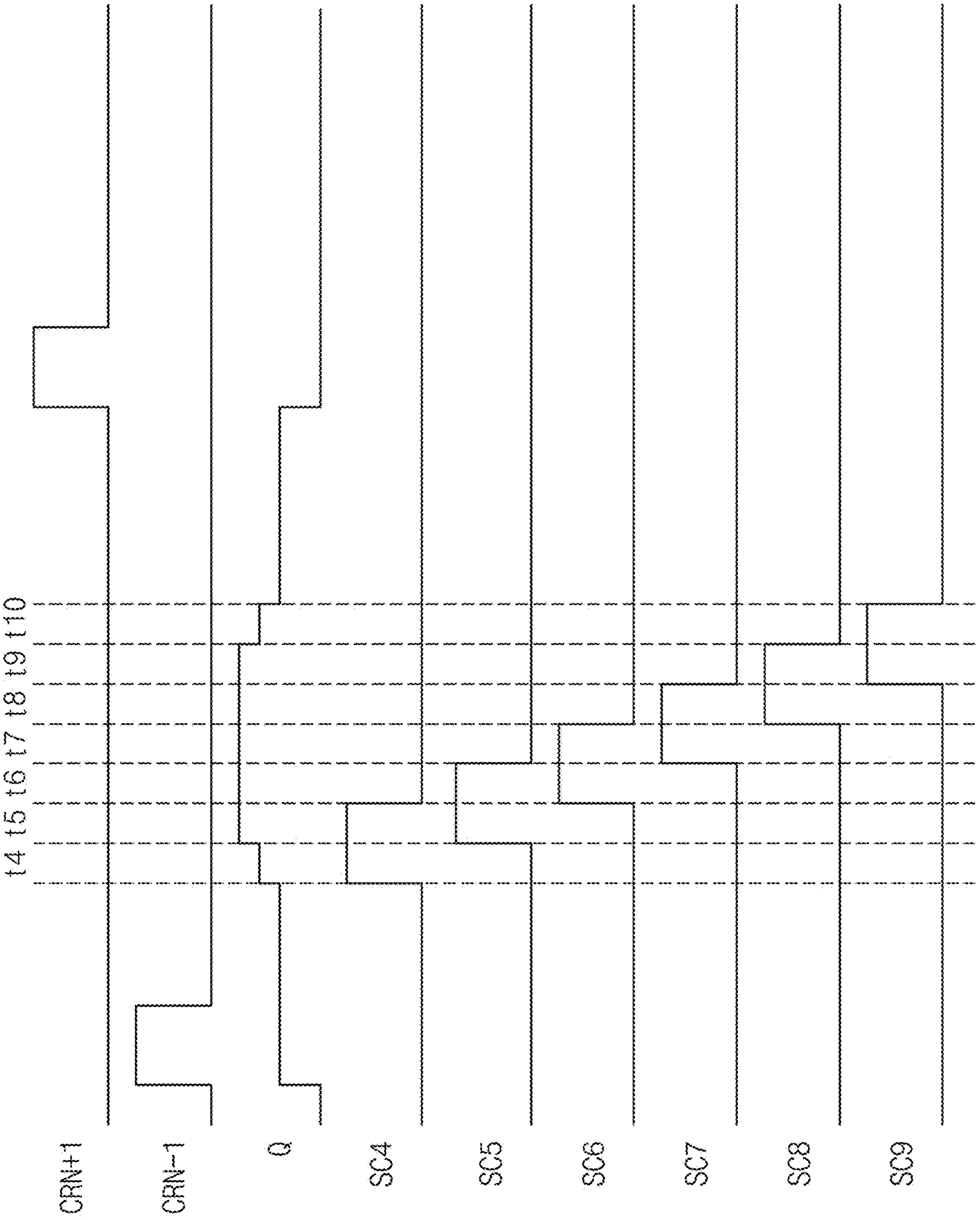
FIG. 7B is a timing diagram illustrating a previous carry signal, a next carry signal, a signal of a first control node and plural gate signals of the present stage of FIG. 6.

FIG. 6 is a circuit diagram illustrating a present stage of a display apparatus according to embodiments of the present inventive concepts. FIG. 7A is a timing diagram illustrating a previous carry signal CRN−1, a next carry signal CRN+1, a signal of a first control node Q and plural gate signals SC5 to SC8 of a present stage according to a comparative example. FIG. 7B is a timing diagram illustrating a previous carry signal CRN−1, a next carry signal CRN+1, a signal of a first control node Q and plural gate signals SC4 to SC9 of the present stage of FIG. 6.

The gate driver and the display apparatus according to the present example are substantially the same as the gate driver and the display apparatus of the previous example explained referring to FIGS. 1 to 5D except that the compensation circuit further includes a second capacitor. Thus, the same reference numerals (or similar reference numerals) will be used to refer to the same or like parts as those described in the previous example of FIGS. 1 to 5D and any repetitive explanation concerning the above elements will be omitted.

Referring to FIGS. 1, 2, 4, 6, 7A and 7B, the present stage among the plurality of stages may include an output circuit 312 outputting a plurality of gate signals SCA, SCB, SCC and SCD corresponding to a plurality of clock signals CK_SCA, CK_SCB, CK_SCC and CK_SCD based on a signal of a first control node Q and a signal of a second control node QB and a compensation circuit 314A connected to the first control node Q of the present stage.

In the present example, the compensation circuit 314A may include a first capacitor C1 including a first electrode receiving one (e.g. SCE) of a plurality of gate signals of a next stage among the plurality of stages and a second electrode connected to the first control node Q of the present stage, and a second capacitor C2 including a first electrode receiving one (e.g. SCL) of a plurality of gate signals of previous stage among the plurality of stages and a second electrode connected to the first control node Q of the present stage.

In the present example, the first electrode of the first capacitor C1 may receive a first gate signal SCE among the plurality of gate signals of the next stage.

In the present example, the first electrode of the second capacitor C2 may receive a last gate signal SCL among the plurality of gate signals of the previous stage.

In FIGS. 4 and 7B, a present stage may output four gate signals SC5, SC6, SC7 and SC8 based on fifth to eighth clock signals CK_SC5 to CK_SC8.

In FIGS. 4 and 7B, the first gate signal among the plurality of gate signals of the next stage applied to the first electrode of the first capacitor C1 may be SC9 and the last gate signal among the plurality of gate signals of the previous stage applied to the first electrode of the first capacitor C1 may be SC4.

In FIGS. 7A and 7B, the signal of the first control node Q and the plural gate signals SC5 to SC8 are conceptually illustrated as square waveforms for convenience of explanation.

In the comparative example of FIG. 7A, the present stage may not include the compensation circuit 314A of FIG. 6. In contrast, in the present example of FIG. 7B, the present stage may include the compensation circuit 314A for further bootstrapping the first control node Q.

In the present example, the compensation circuit 314A may include the first capacitor C1 receiving the first gate signal (SC9 in FIG. 7B) of the next stage and the second capacitor C2 receiving the last gate signal (SC4 in FIG. 7B).

In FIG. 7B, in a fifth period t5 in which the fifth gate signal SC5 starts to be output, the first control node Q may be bootstrapped using a fourth gate signal SC4 of the previous stage overlapping the fifth gate signal SC5. In addition, in a sixth period t6 in which the output of the fifth gate signal SC5 continues, another gate signal SC6 overlapping the fifth gate signal SC5 may be generated in the present stage and a clock signal CR_SC6 overlapping the fifth gate signal SC5 may be applied to the present stage.

Thus, a bootstrap degree of the first control node Q may be relatively increased and an average level of the signal of the first control node Q may be relatively increased in a period t5 and t6 in which the fifth gate signal SC5 is output.

In FIG. 7B, in an eighth period t8 in which the eighth gate signal SC8 starts to be output, another gate signal SC7 overlapping the eighth gate signal SC8 may be generated in the present stage and a clock signal CR_SC7 overlapping the eighth gate signal SC8 may be applied to the present stage. In addition, in a ninth period t9 in which the output of the eighth gate signal SC8 continues, the first control node Q may be bootstrapped using a ninth gate signal SC9 of the next stage overlapping the eighth gate signal SC8. Thus, a bootstrap degree of the first control node Q may be relatively increased and an average level of the signal of the first control node Q may be relatively increased in a period t8 and t9 in which the eighth gate signal SC8 is output.

In FIG. 7B, the rising time and the falling time of the fifth gate signal SC5 may be shortened and the falling time of the eighth gate signal SC8 may be shortened.

Therefore, the waveform difference between the plural gate signals SC5, SC6, SC7 and SC8 from the single stage may be reduced.

According to the present example, the present stage may include the compensation circuit 314A receiving one SC9 of the gate signals of the next stage so that the first control node Q may be bootstrapped. Thus, the falling of the last gate signal SC8 of the present stage may not become slow.

In addition, the present stage may include the compensation circuit 314A receiving one SC4 of the gate signals of the previous stage so that the first control node Q may be bootstrapped. Thus, the rising time or the falling time of the first gate signal SC5 of the present stage may not become slow.

Therefore, the waveform difference between the plural gate signals may be reduced when the single stage outputs the plural gate signals. Thus, a reliability of the gate driving circuit may be enhanced and the display quality of the display panel 100 may be enhanced.

Figure 8:
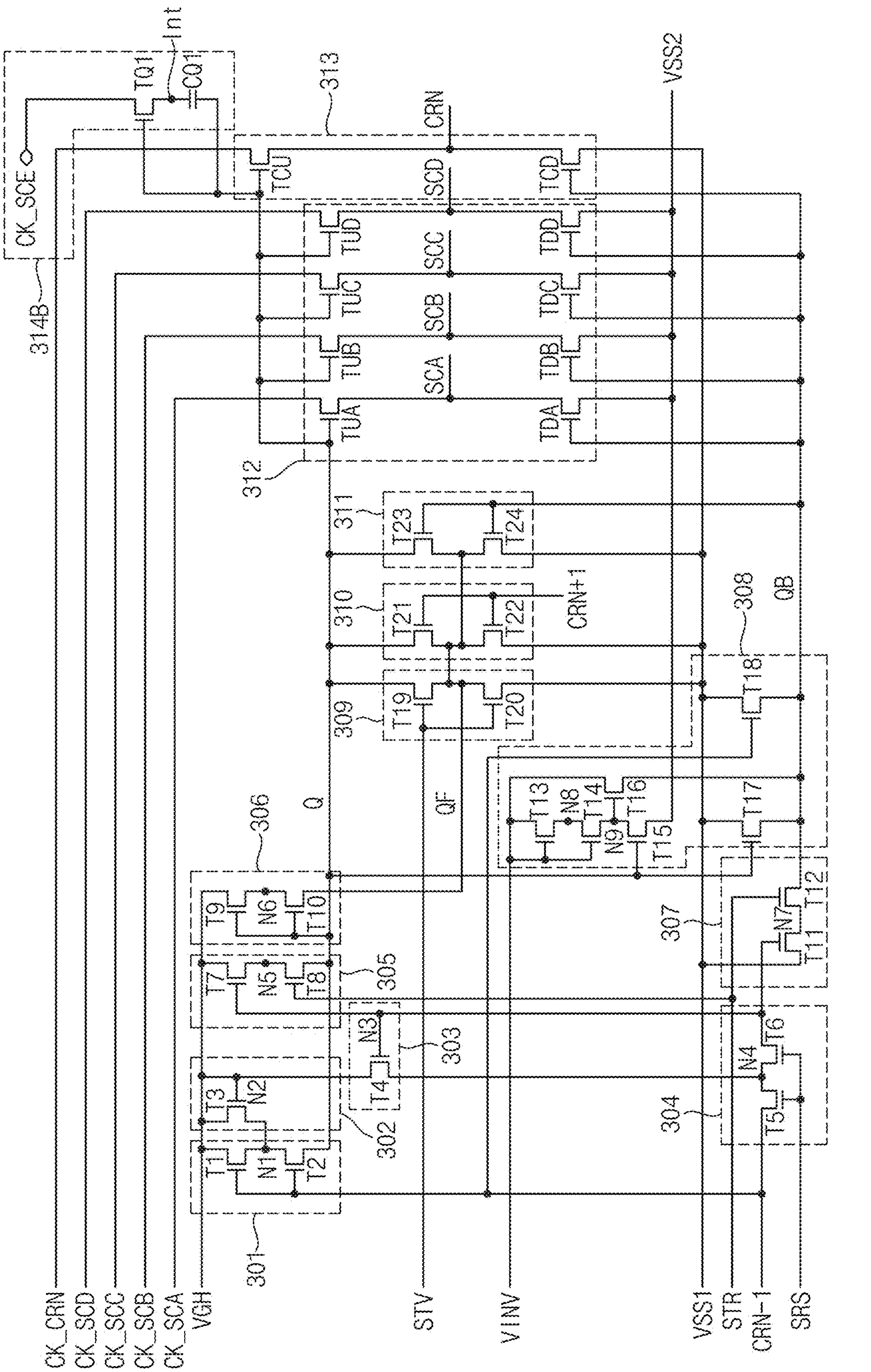
FIG. 8 is a circuit diagram illustrating a present stage of a display apparatus according to embodiments of the present inventive concepts.
Figure 9A:
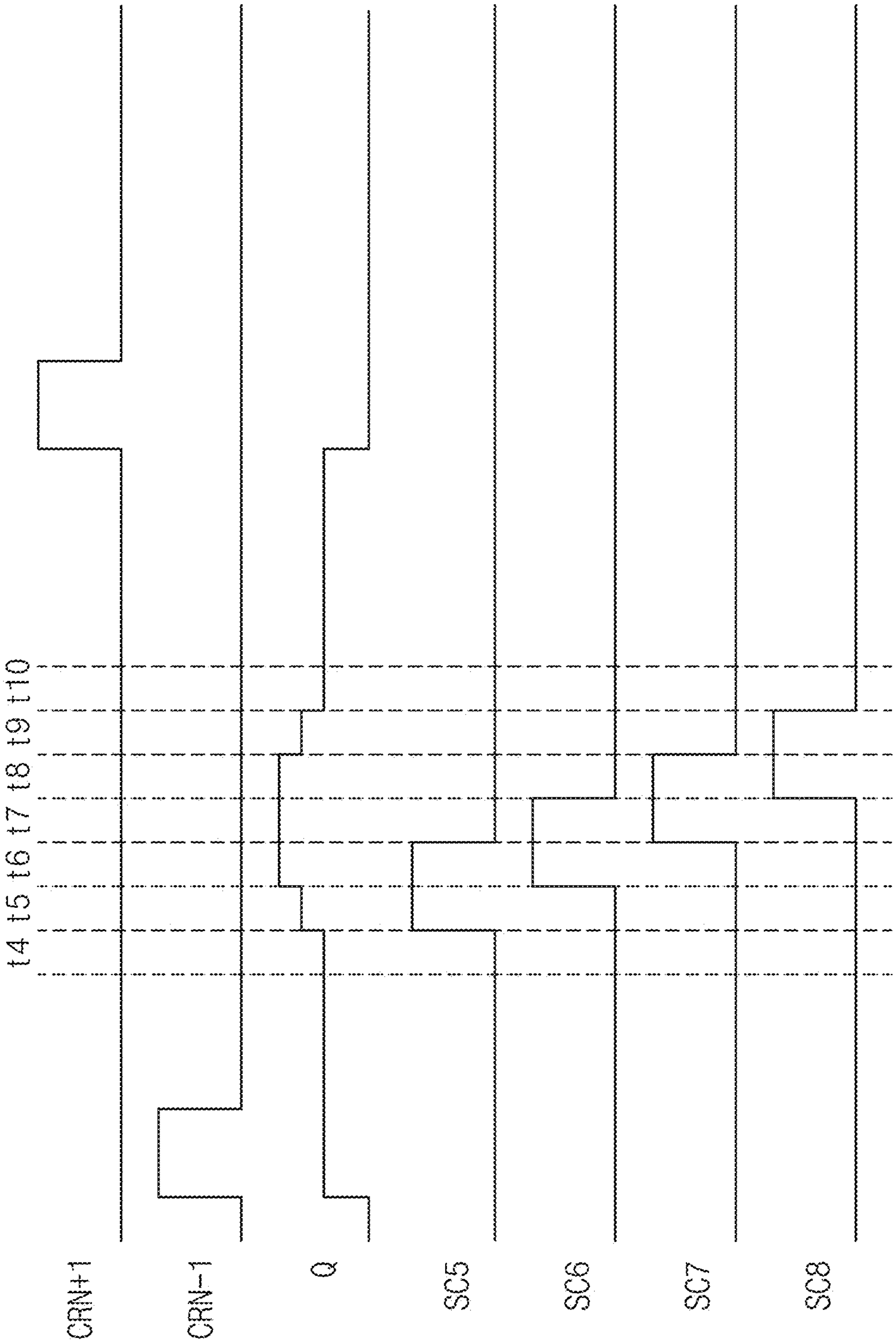
FIG. 9A is a timing diagram illustrating a previous carry signal, a next carry signal, a signal of a first control node and plural gate signals of a present stage according to a comparative example.
Figure 9B:
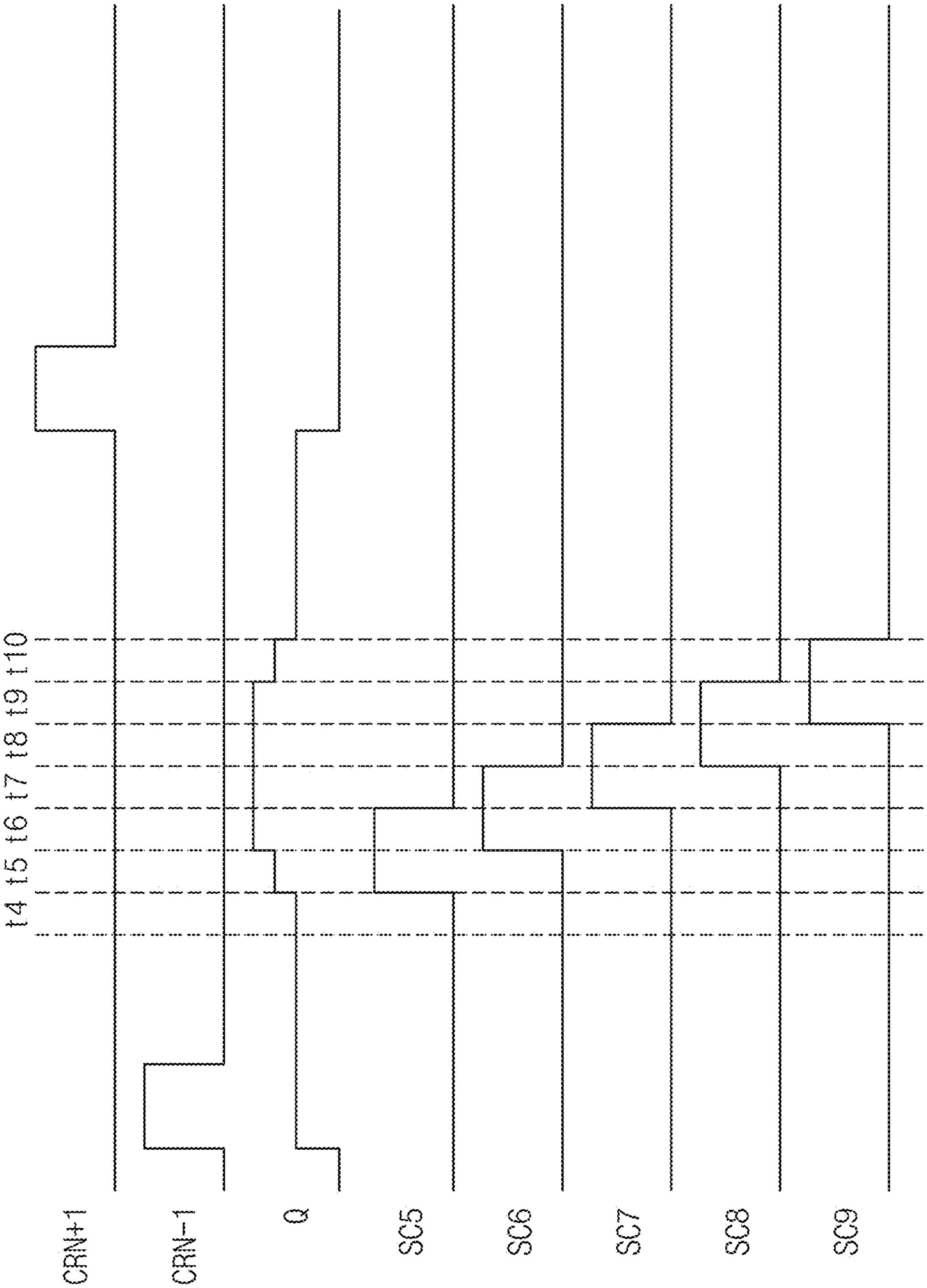
FIG. 9B is a timing diagram illustrating a previous carry signal, a next carry signal, a signal of a first control node and plural gate signals of the present stage of FIG. 8.

FIG. 8 is a circuit diagram illustrating a present stage of a display apparatus according to embodiments of the present inventive concepts. FIG. 9A is a timing diagram illustrating a previous carry signal CRN−1, a next carry signal CRN+1, a signal of a first control node Q and plural gate signals SC5 to SC8 of a present stage according to a comparative example. FIG. 9B is a timing diagram illustrating a previous carry signal CRN−1, a next carry signal CRN+1, a signal of a first control node Q and plural gate signals SC5 to SC9 of the present stage of FIG. 8.

The gate driver and the display apparatus according to the present example are substantially the same as the gate driver and the display apparatus of the previous example explained referring to FIGS. 1 to 5D except for a structure of the compensation circuit. Thus, the same reference numerals (or similar reference numerals) will be used to refer to the same or like parts as those described in the previous example of FIGS. 1 to 5D and any repetitive explanation concerning the above elements will be omitted.

Referring to FIGS. 1, 2, 4, 8, 9A and 9B, the present stage among the plurality of stages may include an output circuit 312 outputting a plurality of gate signals SCA, SCB, SCC and SCD corresponding to a plurality of clock signals CK_SCA, CK_SCB, CK_SCC and CK_SCD based on a signal of a first control node Q and a signal of a second control node QB and a compensation circuit 314B connected to the first control node Q of the present stage.

In the present example, the compensation circuit 314B may include a first compensation transistor TQ1 including a control electrode connected to the first control node Q, a first electrode receiving one (e.g. CK_SCE) of a plurality of next clock signals applied to a next stage among the plurality of stages and a second electrode connected to a first intermediate node Int, and a first compensation capacitor CQ1 including a first electrode connected to the first intermediate node Int and a second electrode connected to the first control node Q.

In the present example, the first electrode of the first compensation transistor TQ1 may receive a first next clock signal CK_SCE among the plurality of next clock signals.

In FIGS. 4 and 9B, a present stage may output four gate signals SC5, SC6, SC7 and SC8 based on fifth to eighth clock signals CK_SC5 to CK_SC8.

In FIGS. 4 and 9B, the first next clock signal among the plurality of next clock signals applied to the first electrode of the first compensation transistor TQ1 may be CK_SC9 corresponding to SC9.

In FIGS. 9A and 9B, the signal of the first control node Q and the plural gate signals SC5 to SC8 are conceptually illustrated as square waveforms for convenience of explanation.

In the comparative example of FIG. 9A, the present stage may not include the compensation circuit 314B of FIG. 8. In contrast, in the present example of FIG. 9B, the present stage may include the compensation circuit 314B for further bootstrapping the first control node Q.

In the present example, the compensation circuit 314B may include a first compensation transistor TQ1 receiving the first clock signal (CK_SC9 in FIG. 4) of the next stage.

In FIG. 9B, in an eighth period t8 in which the eighth gate signal SC8 starts to be output, another gate signal SC7 overlapping the eighth gate signal SC8 may be generated in the present stage and a clock signal CR_SC7 overlapping the eighth gate signal SC8 may be applied to the present stage. In addition, in a ninth period t9 in which the output of the eighth gate signal SC8 continues, the first control node Q may be bootstrapped using a ninth clock signal CK_SC9 of the next stage overlapping the eighth gate signal SC8. Thus, a bootstrap degree of the first control node Q may be relatively increased and an average level of the signal of the first control node Q may be relatively increased in a period t8 and t9 in which the eighth gate signal SC8 is output.

In FIG. 9B, the falling time of the eighth gate signal SC8 may be shortened.

Therefore, the waveform difference between the plural gate signals SC5, SC6, SC7 and SC8 from the single stage may be reduced.

According to the present example, the present stage may include the compensation circuit 314B receiving one CK_SC9 of the clock signals of the next stage so that the first control node Q may be bootstrapped. Thus, the falling of the last gate signal SC8 of the present stage may not become slow.

Therefore, the waveform difference between the plural gate signals may be reduced when the single stage outputs the plural gate signals. Thus, a reliability of the gate driving circuit may be enhanced and the display quality of the display panel 100 may be enhanced.

Figure 10:
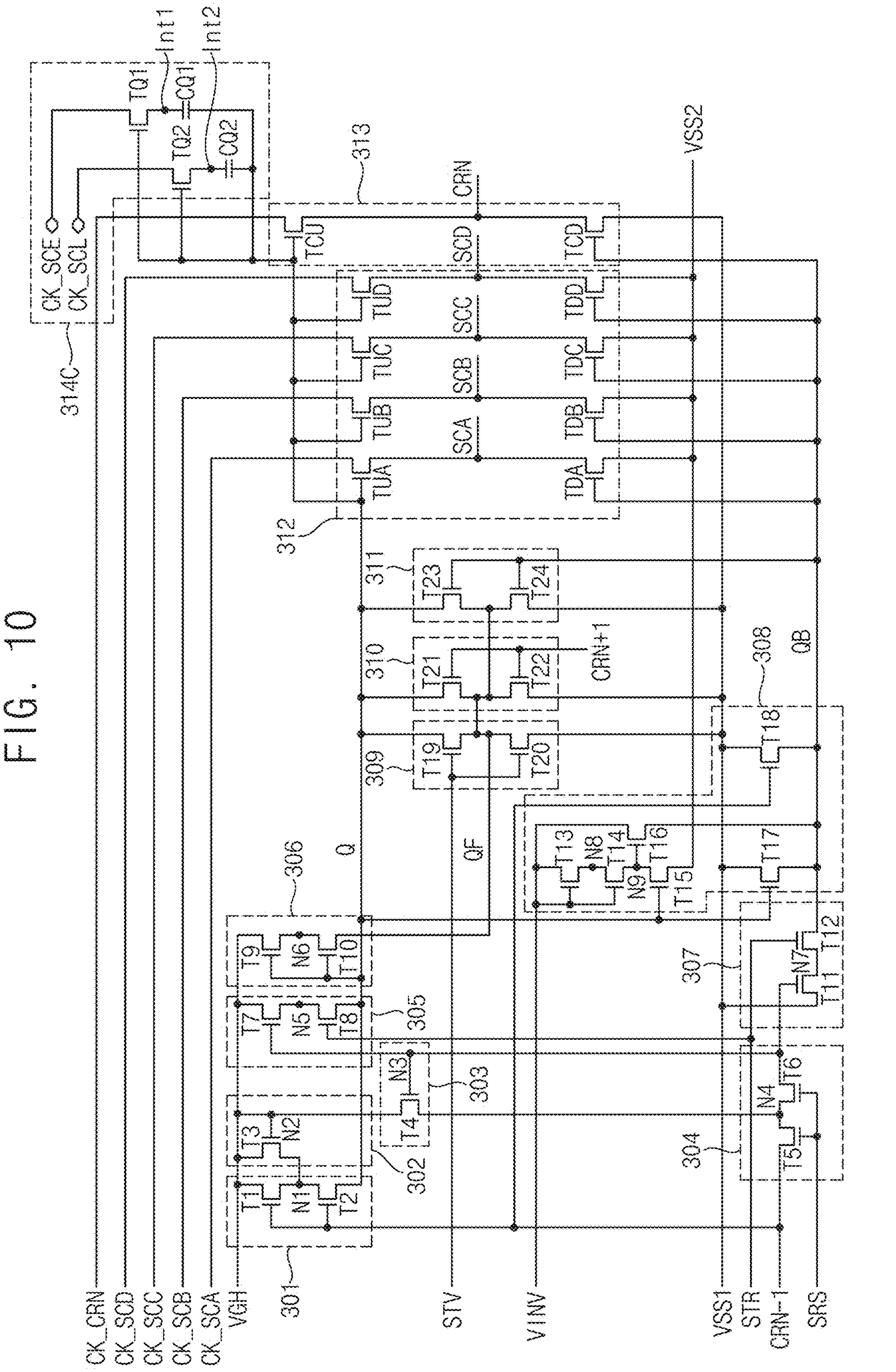
FIG. 10 is a circuit diagram illustrating a present stage of a display apparatus according to embodiments of the present inventive concepts.
Figure 11A:
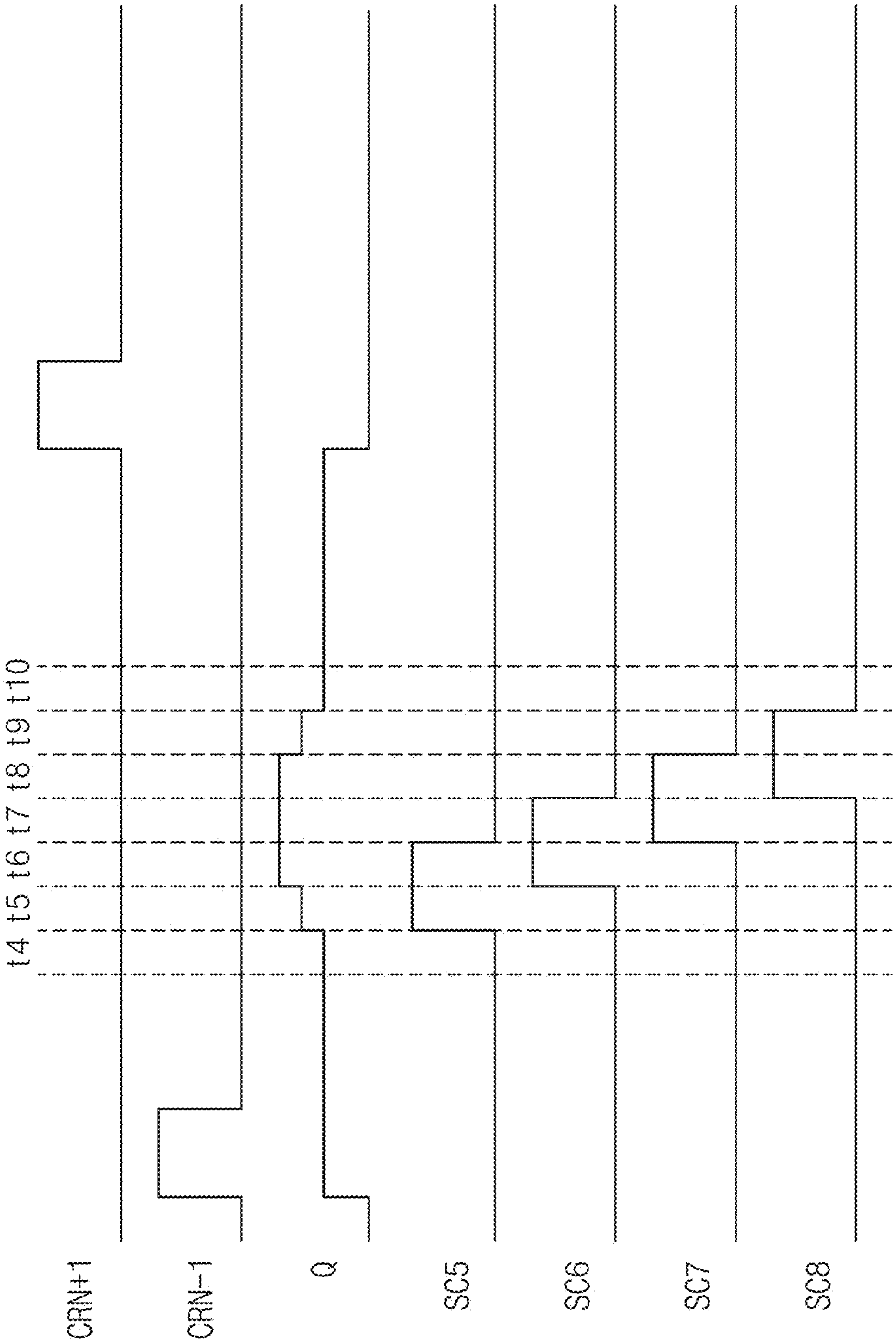
FIG. 11A is a timing diagram illustrating a previous carry signal, a next carry signal, a signal of a first control node and plural gate signals of a present stage according to a comparative example.
Figure 11B:
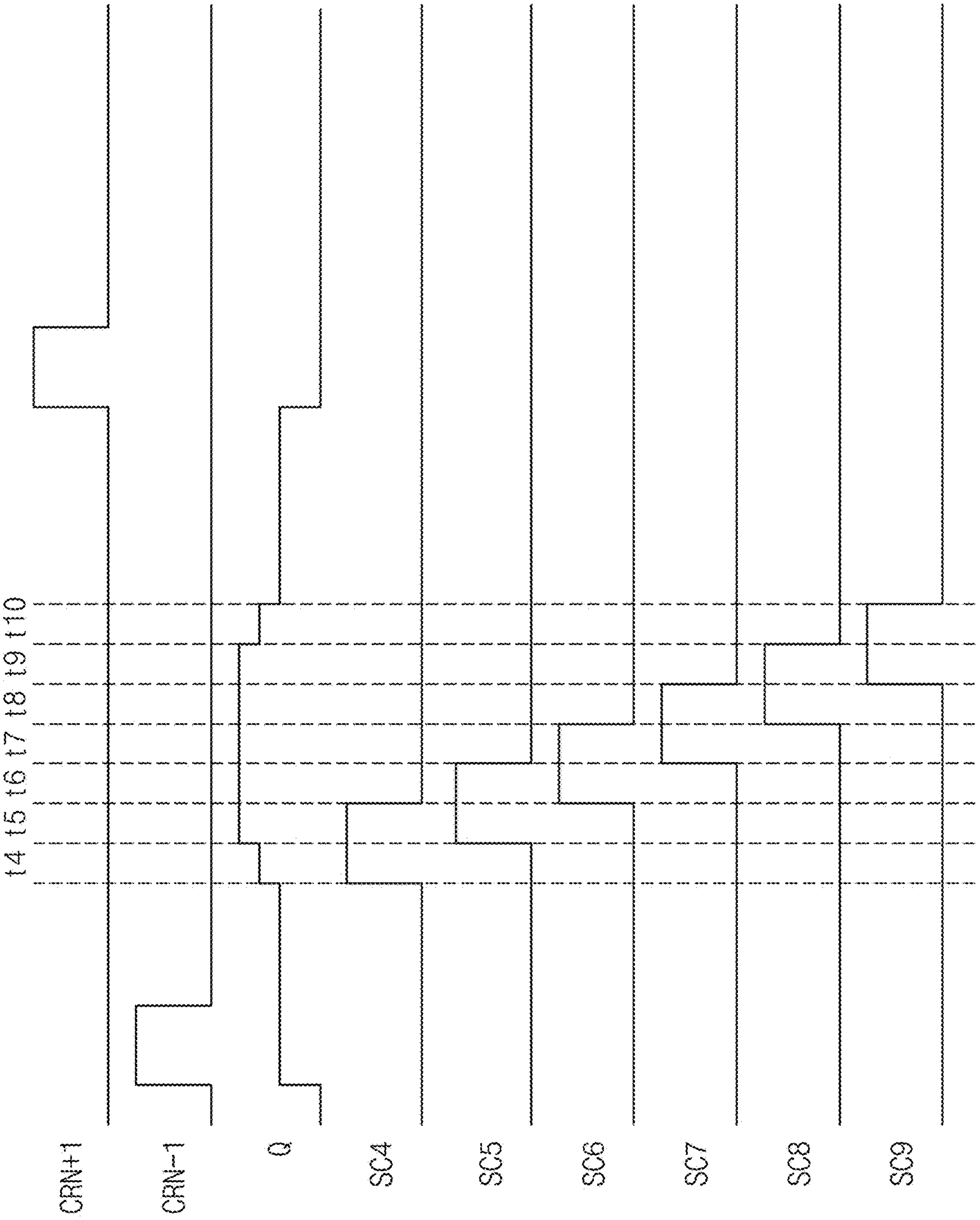
FIG. 11B is a timing diagram illustrating a previous carry signal, a next carry signal, a signal of a first control node and plural gate signals of the present stage of FIG. 10.

FIG. 10 is a circuit diagram illustrating a present stage of a display apparatus according to embodiments of the present inventive concepts. FIG. 11A is a timing diagram illustrating a previous carry signal CRN−1, a next carry signal CRN+1, a signal of a first control node Q and plural gate signals SC5 to SC8 of a present stage according to a comparative example. FIG. 11B is a timing diagram illustrating a previous carry signal CRN−1, a next carry signal CRN+1, a signal of a first control node Q and plural gate signals SC4 to SC9 of the present stage of FIG. 10.

The gate driver and the display apparatus according to the present example are substantially the same as the gate driver and the display apparatus of the previous example explained referring to FIGS. 1 to 5D except for a structure of the compensation circuit. Thus, the same reference numerals (or similar reference numerals) will be used to refer to the same or like parts as those described in the previous example of FIGS. 1 to 5D and any repetitive explanation concerning the above elements will be omitted.

Referring to FIGS. 1, 2, 4, 10, 11A and 11B, the present stage among the plurality of stages may include an output circuit 312 outputting a plurality of gate signals SCA, SCB, SCC and SCD corresponding to a plurality of clock signals CK_SCA, CK_SCB, CK_SCC and CK_SCD based on a signal of a first control node Q and a signal of a second control node QB and a compensation circuit 314C connected to the first control node Q of the present stage.

In the present example, the compensation circuit 314C may include a first compensation transistor TQ1 including a control electrode connected to the first control node Q, a first electrode receiving one (e.g. CK_SCE) of a plurality of next clock signals applied to a next stage among the plurality of stages and a second electrode connected to a first intermediate node Int1, and a first compensation capacitor CQ1 including a first electrode connected to the first intermediate node Int1 and a second electrode connected to the first control node Q, a second compensation transistor TQ2 including a control electrode connected to the first control node Q, a first electrode receiving one (e.g. CK_SCL) of a plurality of previous clock signals applied to a previous stage among the plurality of stages and a second electrode connected to a second intermediate node Int2, a second compensation capacitor CQ2 including a first electrode connected to the second intermediate node Int2 and a second electrode connected to the first control node Q.

In the present example, the first electrode of the first compensation transistor TQ1 may receive a first next clock signal CK_SCE among the plurality of next clock signals.

In the present example, the first electrode of the second compensation transistor TQ2 may receive a last previous clock signal CK_SCL among the plurality of previous clock signals.

In FIGS. 4 and 11B, a present stage may output four gate signals SC5, SC6, SC7 and SC8 based on fifth to eighth clock signals CK_SC5 to CK_SC8.

In FIGS. 4 and 11B, the first next clock signal among the plurality of next clock signals applied to the first electrode of the first compensation transistor TQ1 may be CK_SC9 corresponding to SC9.

In FIGS. 4 and 11B, the last previous clock signal among the plurality of previous clock signals applied to the first electrode of the second compensation transistor TQ2 may be CK_SC4 corresponding to SC4.

In FIGS. 11A and 11B, the signal of the first control node Q and the plural gate signals SC5 to SC8 are conceptually illustrated as square waveforms for convenience of explanation.

In the comparative example of FIG. 11A, the present stage may not include the compensation circuit 314C of FIG. 10. In contrast, in the present example of FIG. 11B, the present stage may include the compensation circuit 314C for further bootstrapping the first control node Q.

In the present example, the compensation circuit 314C may include a first compensation transistor TQ1 receiving the first clock signal (CK_SC9 in FIG. 4) of the next stage and a second compensation transistor TQ2 receiving the last clock signal (CK_SC4 in FIG. 4) of the previous stage.

In FIG. 11B, in a fifth period t5 in which the fifth gate signal SC5 starts to be output, the first control node Q may be bootstrapped using a fourth clock signal CK_SC4 of the previous stage overlapping the fifth gate signal SC5. In addition, in a sixth period t6 in which the output of the fifth gate signal SC5 continues, another gate signal SC6 overlapping the fifth gate signal SC5 may be generated in the present stage and a clock signal CR_SC6 overlapping the fifth gate signal SC5 may be applied to the present stage. Thus, a bootstrap degree of the first control node Q may be relatively increased and an average level of the signal of the first control node Q may be relatively increased in a period t5 and t6 in which the fifth gate signal SC5 is output.

In FIG. 11B, in an eighth period t8 in which the eighth gate signal SC8 starts to be output, another gate signal SC7 overlapping the eighth gate signal SC8 may be generated in the present stage and a clock signal CR_SC7 overlapping the eighth gate signal SC8 may be applied to the present stage. In addition, in a ninth period t9 in which the output of the eighth gate signal SC8 continues, the first control node Q may be bootstrapped using a ninth clock signal CK_SC9 of the next stage overlapping the eighth gate signal SC8. Thus, a bootstrap degree of the first control node Q may be relatively increased and an average level of the signal of the first control node Q may be relatively increased in a period t8 and t9 in which the eighth gate signal SC8 is output.

In FIG. 11B, the rising time and the falling time of the fifth gate signal SC5 may be shortened and the falling time of the eighth gate signal SC8 may be shortened.

Therefore, the waveform difference between the plural gate signals SC5, SC6, SC7 and SC8 from the single stage may be reduced.

According to the present example, the present stage may include the compensation circuit 314C receiving one CK_SC9 of the clock signals of the next stage so that the first control node Q may be bootstrapped. Thus, the falling of the last gate signal SC8 of the present stage may not become slow.

In addition, the present stage may include the compensation circuit 314C receiving one CK_SC4 of the clock signals of the previous stage so that the first control node Q may be bootstrapped. Thus, the rising or falling of the first gate signal SC5 of the present stage may not become slow.

Therefore, the waveform difference between the plural gate signals may be reduced when the single stage outputs the plural gate signals. Thus, a reliability of the gate driving circuit may be enhanced and the display quality of the display panel 100 may be enhanced.

Figure 12:
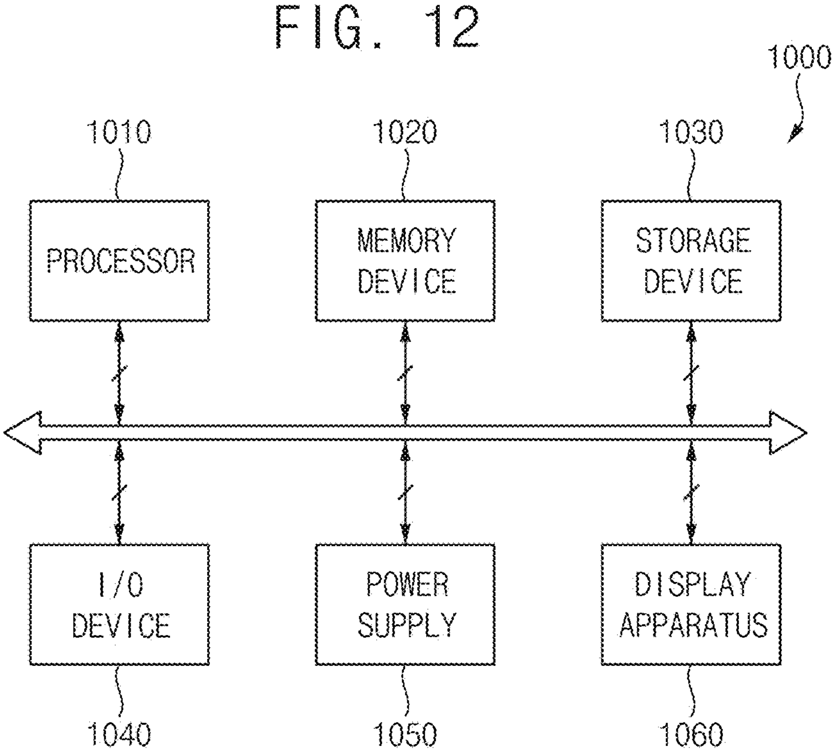
FIG. 12 is a block diagram illustrating an electronic apparatus according to a comparative example.
Figure 13:
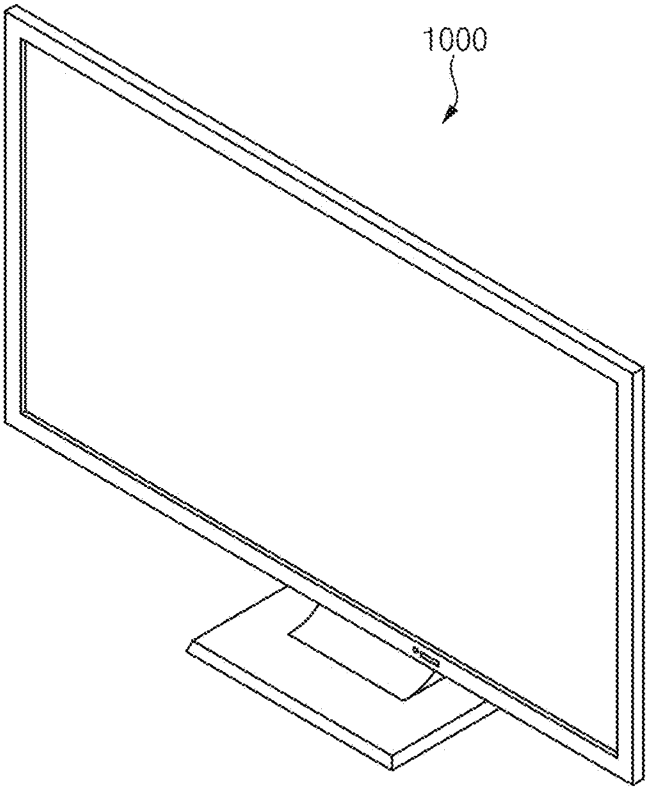
FIG. 13 is a diagram illustrating an example in which the electronic apparatus of FIG. 12 is implemented as a monitor.
Figure 14:
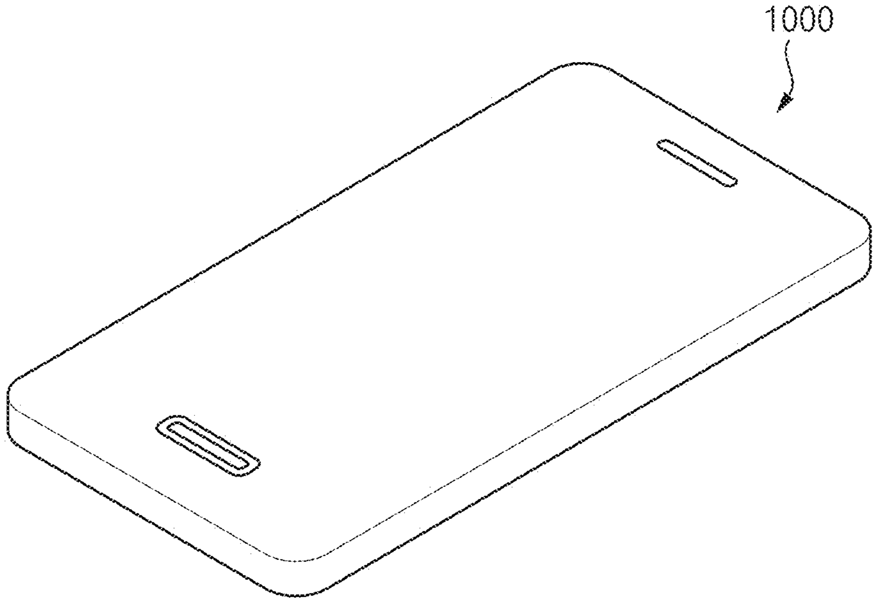
FIG. 14 is a diagram illustrating an example in which the electronic apparatus of FIG. 12 is implemented as a smart phone.

FIG. 12 is a block diagram illustrating an electronic apparatus 1000 according to embodiments. FIG. 13 is a diagram illustrating an example in which the electronic apparatus 1000 of FIG. 12 is implemented as a monitor. FIG. 14 is a diagram illustrating an example in which the electronic apparatus 1000 of FIG. 12 is implemented as a smart phone.

Referring to FIGS. 12 to 14, the electronic apparatus 1000 may include a processor 1010, a memory device 1020, a storage device 1030, an input/output (I/O) device 1040, a power supply 1050 and/or a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In embodiments, as illustrated in FIG. 13, the electronic apparatus 1000 may be implemented as a monitor. In embodiments, as illustrated in FIG. 14, the electronic apparatus 1000 may be implemented as a smartphone. However, the electronic apparatus 1000 is not limited thereto. For example, the electronic apparatus 1000 may be implemented as a television, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In embodiments, the display apparatus 1060 may be included in the I/O device 1040. The power supply 1050 may provide power for operations of the electronic apparatus 1000. The display apparatus 1060 may be coupled to other components via the buses or other communication links.

According to the gate driving circuit and the electronic apparatus in the present inventive concepts, the waveform difference between the plural gate signals may be reduced when the single stage outputs the plural gate signals. Thus, a reliability of the gate driving circuit may be enhanced and a display quality of the display panel may be enhanced.

Conventional devices and methods for providing gate signals to a display panel experience excessive variation between waveforms of the gate signals due to a varying voltage of a control node. Accordingly, the conventional devices and methods suffer from reduced reliability and/or display quality as a result of the waveform variation.

However, according to embodiments, improved devices and methods are provided for proving gate signals to a display panel. For example, the improved devices may include a compensation circuit that reduces the waveform variation of one or more gate signals using at least one signal from another stage (e.g., a gate signal and/or clock signal from a previous state and/or a next stage). Accordingly, the improved device and methods overcome the deficiencies of the conventional devices and methods to at least improve reliability and/or display quality.

According to embodiments, operations described herein as being performed by the display apparatus, the display panel 100, the display panel driver, the driving controller 200, the gate driver 300, the gamma reference voltage generator 400, the data driver 500, the gate driving circuit, each of plurality of stages STN−1, STN and STN+1, the electronic apparatus 1000, the processor 1010, the input/output (I/O) device 1040, the power supply 1050 and/or the display apparatus 1060 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm, and/or functions, described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

It will be understood that when an element is referred to as being "connected" or "coupled" to another element, it may be directly connected or coupled to the other element or intervening elements may be present. As used herein the term "and/or" includes any and all combinations of one or more of the associated listed items. Other words used to describe the relationship between elements should be interpreted in a like fashion (e.g., "between" versus "directly between," "adjacent" versus "directly adjacent," etc.).

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. As used herein the term "and/or" includes any and all combinations of one or more of the associated listed items.

The foregoing is illustrative of the present inventive concepts and is not to be construed as limiting thereof. Although embodiments of the present inventive concepts have been described, those skilled in the art will readily appreciate that many modifications are possible in thereto without materially departing from the novel teachings and advantages of the present inventive concepts. Accordingly, all such modifications are intended to be included within the scope of the present inventive concepts as defined in the claims. In the claims, means-plus-function clauses are intended to cover the structures described herein as performing the recited function and not only structural equivalents but also equivalent structures. Therefore, it is to be understood that the foregoing is illustrative of the present inventive concepts and is not to be construed as limited to the specific examples disclosed, and that modifications to the disclosed examples, as well as other examples, are intended to be included within the scope of the appended claims. The present inventive concepts are defined by the following claims, with equivalents of the claims to be included therein.

What is claimed is:

1. A gate driving circuit, comprising:

a plurality of stages, a first stage among the plurality of stages including, an output circuit configured to output a plurality of gate signals based on a signal of a first control node and a signal of a second control node, the plurality of gate signals corresponding to a plurality of clock signals, and a first capacitor including a first electrode and a second electrode, the first electrode of the first capacitor being configured to receive one of a plurality of gate signals of a next stage among the plurality of stages, and the second electrode of the first capacitor being connected to the first control node of the first stage.

2. The gate driving circuit of claim 1, wherein the first electrode of the first capacitor is configured to receive an earliest gate signal among the plurality of gate signals of the next stage.

3. The gate driving circuit of claim 1, wherein the first stage comprises a second capacitor including a first electrode and a second electrode, the first electrode of the second capacitor being configured to receive one of a plurality of gate signals of a previous stage among the plurality of stages, and the second electrode of the second capacitor being connected to the first control node of the first stage.

4. The gate driving circuit of claim 3, wherein the first electrode of the second capacitor is configured to receive a last gate signal among the plurality of gate signals of the previous stage.

5. The gate driving circuit of claim 1, wherein the output circuit comprises:

a first output transistor including a control electrode, a first electrode and a second electrode, the control electrode of the first output transistor being connected to the first control node, the first electrode of the first output transistor being configured to receive a first clock signal, and the second electrode of the first output transistor being connected to a first output node;

a second output transistor including a control electrode, a first electrode and a second electrode, the control electrode of the second output transistor being connected to the second control node, the first electrode of the second output transistor being configured to receive a power voltage, and the second electrode of the second output transistor being connected to the first output node;

a third output transistor including a control electrode, a first electrode and a second electrode, the control electrode of the third output transistor being connected to the first control node, the first electrode of the third output transistor being configured to receive a second clock signal, and the second electrode of the third output transistor being connected to a second output node; and a fourth output transistor including a control electrode, a first electrode and a second electrode, the control electrode of the fourth output transistor being connected to the second control node, the first electrode of the fourth output transistor being configured to receive the power voltage, and the second electrode of the fourth output transistor being connected to the second output node.

6. The gate driving circuit of claim 1, wherein the first stage comprises a carry circuit, the carry circuit including, a first carry transistor including a control electrode, a first electrode and a second electrode, the control electrode of the first carry transistor being connected to the first control node, the first electrode of the first carry transistor being configured to receive a carry clock signal, and the second electrode of the first carry transistor being connected to a carry output node, and a second carry transistor including a control electrode, a first electrode and a second electrode, the control electrode of the second carry transistor being connected to the second control node, the first electrode of the second carry transistor being configured to receive a second power voltage, and a second electrode of the second carry transistor being connected to the carry output node.

7. The gate driving circuit of claim 1, wherein the first stage comprises a first circuit, the first circuit including, a first transistor including a control electrode, a first electrode and a second electrode, the control electrode of the first transistor being configured to receive a previous carry signal of a previous stage among the plurality of stages, the first electrode of the first transistor being configured to receive a power voltage, and the second electrode of the first transistor being connected to a first node, and a second transistor including a control electrode, a first electrode and a second electrode, the control electrode of the second transistor being configured to receive the previous carry signal, the first electrode of the second transistor being connected to the first node, and the second electrode of the second transistor being connected to the first control node.

8. The gate driving circuit of claim 7, wherein the first stage comprises a second circuit, the second circuit including, a third transistor including a control electrode, a first electrode, and a second electrode, the control electrode of the third transistor being configured to receive the power voltage, the first electrode of the third transistor being configured to receive the power voltage, and the second electrode of the third transistor being connected to the first node.

9. The gate driving circuit of claim 1, wherein the first stage comprises a first circuit, the first circuit including, a first transistor including a control electrode, a first electrode and a second electrode, the control electrode of the first transistor being configured to receive a control signal, the first electrode of the first transistor being configured to receive a previous carry signal, and the second electrode of the first transistor being connected to a first node, and a second transistor including a control electrode, a first electrode and a second electrode, the control electrode of the second transistor being configured to receive the control signal, the first electrode of the second transistor being connected to the first node, and the second electrode of the second transistor being connected to a second node.

10. The gate driving circuit of claim 9, wherein the first stage comprises a second circuit, the second circuit including, a third transistor including a control electrode, a first electrode and a second electrode, the control electrode of the third transistor being connected to the second node, the first electrode of the third transistor being configured to receive a power voltage, and the second electrode of the third transistor being connected to the first node.

11. The gate driving circuit of claim 1, wherein the first stage comprises a first circuit, the first circuit including, a first transistor including a control electrode, a first electrode and a second electrode, the control electrode of the first transistor being connected to a first node, the first electrode of the first transistor being configured to receive a power voltage, and the second electrode of the first transistor being connected to a second node, and an second transistor including a control electrode, a first electrode and a second electrode, the control electrode of the second transistor being configured to receive a control signal, the first electrode of the second transistor being connected to the first node, and the second electrode of the first transistor being connected to the first control node.

12. The gate driving circuit of claim 1, wherein the first stage comprises a first circuit, the first circuit including, a first transistor including a control electrode, a first electrode and a second electrode, the control electrode of the first transistor being connected to the first control node, the first electrode of the first transistor being configured to receive a power voltage, and the second electrode of the first transistor being connected to a first node, and a second transistor including a control electrode, a first electrode and a second electrode, the control electrode of the second transistor being connected to the first control node, the first electrode of the second transistor being connected to the first node, and the second electrode of the second transistor being connected to a third control node.

13. The gate driving circuit of claim 1, wherein the first stage comprises a first circuit, the first circuit including, a first transistor including a control electrode, a first electrode and a second electrode, the control electrode of the first transistor being connected to first node, the first electrode of the first transistor being configured to receive a power voltage, and the second electrode of the first transistor being connected to a second node, and a second transistor including a control electrode, a first electrode and a second electrode, the control electrode of the second transistor being configured to receive a control signal, the first electrode of the second transistor being connected to the second node, and the second electrode of the second transistor being connected to the second control node.

14. The gate driving circuit of claim 1, wherein the first stage comprises a first circuit, the first circuit including, a first transistor including a control electrode, a first electrode and a second electrode, the control electrode of the first transistor being configured to receive an inverter power voltage, the first electrode of the first transistor being configured to receive the inverter power voltage, and the second electrode of the first transistor being connected to a first node, a second transistor including a control electrode, a first electrode and a second electrode, the control electrode of the second transistor being configured to receive the inverter power voltage, the first electrode of the second transistor being connected to the first node, and the second electrode of the second transistor being connected to a second node, a third transistor including a control electrode, a first electrode and a second electrode, the control electrode of the third transistor being connected to the first control node, the first electrode of the third transistor being connected to the second node, and the second electrode of the third transistor being configured to receive a first power voltage, a fourth transistor including a control electrode, a first electrode and a second electrode, the control electrode of the fourth transistor being connected to the second node, the first electrode of the fourth transistor being configured to receive the inverter power voltage, and the second electrode of the fourth transistor being connected to the second control node, and a fifth transistor including a control electrode, a first electrode and a second electrode, the control electrode of the fifth transistor being connected to the first control node, the first electrode of the fifth transistor being configured to receive a second power voltage, and the second electrode of the fifth transistor being connected to the second control node.

15. The gate driving circuit of claim 1, wherein the first stage comprises a first circuit, the first circuit including, a first transistor including a control electrode, a first electrode and a second electrode, the control electrode of the first transistor being configured to receive a vertical start signal, the first electrode of the first transistor being connected to the first control node, and the second electrode of the first transistor being connected to a third control node, and a second transistor including a control electrode, a first electrode and a second electrode, the control electrode of the second transistor being configured to receive the vertical start signal, the first electrode of the second transistor being connected to the third control node, and the second electrode of the second transistor being configured to receive a power voltage.

16. The gate driving circuit of claim 1, wherein the first stage comprises a first circuit, the first circuit including, a first transistor including a control electrode, a first electrode and a second electrode, the control electrode of the first transistor being configured to receive a next carry signal of the next stage, the first electrode of the first transistor being connected to the first control node, and the second electrode of the first transistor being connected to a third control node, and a second transistor including a control electrode, a first electrode and a second electrode, the control electrode of the second transistor being configured to receive the next carry signal, the first electrode of the second transistor being connected to the third control node, and the second electrode of the second transistor being configured to receive a power voltage.

17. The gate driving circuit of claim 1, wherein the first stage comprises a first circuit, the first circuit including, a first transistor including a control electrode, a first electrode and a second electrode, the control electrode of the first transistor being connected to the second control node, the first electrode of the first transistor being connected to the first control node, and the second electrode of the first transistor being connected to a third control node, and a second transistor including a control electrode, a first electrode and a second electrode, the control electrode of the second transistor being connected to the second control node, the first electrode of the second transistor being connected to the third control node, and the second electrode of the second transistor being configured to receive a power voltage.

18. A gate driving circuit, comprising:

a plurality of stages, a first stage among the plurality of stages including, an output circuit configured to output a plurality of gate signals based on a signal of a first control node and a signal of a second control node, the plurality of gate signals corresponding to a plurality of clock signals; and a compensation circuit connected to the first control node, the compensation circuit including, a first compensation transistor including a control electrode, a first electrode and a second electrode the control electrode of the first compensation transistor being connected to the first control node, the first electrode of the first compensation transistor being configured to receive one of a plurality of next clock signals applied to a next stage among the plurality of stages, and the second electrode of the first compensation transistor being connected to a first intermediate node, and a first compensation capacitor including a first electrode and a second electrode, the first electrode of the first compensation capacitor being connected to the first intermediate node, and the second electrode of the first compensation capacitor being connected to the first control node.

19. The gate driving circuit of claim 18, wherein the compensation circuit comprises:

a second compensation transistor including a control electrode, a first electrode and a second electrode, the control electrode of the second compensation transistor being connected to the first control node, the first electrode of the second compensation transistor being configured to receive one of a plurality of previous clock signals applied to a previous stage among the plurality of stages, and the second electrode of the second compensation transistor being connected to a second intermediate node; and a second compensation capacitor including a first electrode and a second electrode, the first electrode of the second compensation capacitor being connected to the second intermediate node, and the second electrode of the second compensation capacitor being connected to the first control node.

20. An electronic apparatus comprising:

a display panel including a plurality of pixels;

a gate driver configured to output a gate signal to a first pixel among the plurality of pixels;

a data driver configured to output a data voltage to the first pixel;

a driving controller configured to control the gate driver and the data driver; and processing circuitry configured to output input image data and an input control signal to the driving controller, wherein a gate driving circuit of the gate driver includes a plurality of stages, a first stage among the plurality of stages including, an output circuit configured to output a plurality of gate signals based on a signal of a first control node and a signal of a second control node, the plurality of gate signals corresponding to a plurality of clock signals, and a first capacitor including a first electrode and a second electrode, the first electrode of the first capacitor being configured to receive one of a plurality of gate signals of a next stage among the plurality of stages, and the second electrode of the first capacitor being connected to the first control node.

* * * * *